US008611615B2

(12) United States Patent
Yokokawa et al.

(10) Patent No.: US 8,611,615 B2
(45) Date of Patent: Dec. 17, 2013

(54) IMAGE PROCESSING APPARATUS AND METHOD, AND PROGRAM

(75) Inventors: Masatoshi Yokokawa, Kanagawa (JP); Kazuki Aisaka, Kanagawa (JP); Jun Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 75 days.

(21) Appl. No.: 13/056,900

(22) PCT Filed: May 31, 2010

(86) PCT No.: PCT/JP2010/059177
§ 371 (c)(1),
(2), (4) Date: Jan. 31, 2011

(87) PCT Pub. No.: WO2010/143549
PCT Pub. Date: Dec. 16, 2010

(65) Prior Publication Data
US 2012/0070102 A1 Mar. 22, 2012

(30) Foreign Application Priority Data

Jun. 9, 2009 (JP) .................. 2009-138269

(51) Int. Cl.
*G06K 9/00* (2006.01)
(52) U.S. Cl.
USPC ........... 382/118; 382/115; 382/164; 382/173; 382/224; 382/307
(58) Field of Classification Search
USPC .................. 382/115–118, 164, 173, 224, 307
See application file for complete search history.

(56) References Cited

U.S. PATENT DOCUMENTS 7,190,844 B2 * 3/2007 Kobayashi et al. ........... 382/274
7,715,596 B2 * 5/2010 Gehlen et al. ................. 382/118

FOREIGN PATENT DOCUMENTS

| JP | 2-95091 | 4/1990 |
| JP | 2006-128972 | 5/2006 |
| JP | 2008-311821 | 12/2008 |
| JP | 2009-60359 | 3/2009 |

OTHER PUBLICATIONS

Office Action issued by Japan Patent Office on Aug. 27, 2013 in corresponding Application No. JP 2009-138269 (3 pages).

* cited by examiner

*Primary Examiner* — Wesley Tucker
(74) *Attorney, Agent, or Firm* — Finnegan, Henderson, Farabow, Garrett & Dunner, LLP

(57) ABSTRACT

The present invention relates to an image processing apparatus and method, and a program that are capable of more appropriately evaluating the image-capture state of an image. A blur degree score calculation unit 23 through to a chroma score calculation unit 27 extract a feature quantity of a pre-specified feature from an input image, and calculate a feature-by-feature score indicating an evaluation for the input image on the basis of the feature. For example, the luminance score calculation unit 24 extracts, as a feature quantity, a luminance value from the input image, and calculates a luminance score indicating an evaluation based on the distribution of the luminance values in the subject portion of the input image. The overall score calculation unit 28 calculates an overall score indicating the evaluation of the image-capture state of the input image from each feature-by-feature score. As described above, when each feature-by-feature score is to be calculated, by extracting each feature quantity and obtaining a score from the area of the input image suitable for the feature, it is possible to more appropriately evaluate the input image. The present invention can be applied to an image processing apparatus.

8 Claims, 24 Drawing Sheets

FIG. 13

| BLUR DEGREE SCORE | SCORE POINT |
|---|---|
| 0.9 OR MORE | 10 |
| 0.7 OR MORE | 5 |
| 0.5 OR MORE | 3 |
| 0.3 OR MORE | 2 |
| 0.2 OR MORE | 1 |
| LESS THAN 0.2 | 0 |

IMAGE PROCESSING APPARATUS AND METHOD, AND PROGRAM

TECHNICAL FIELD

The present invention relates to an image processing apparatus and method, and a program and, particularly, relates to an image processing apparatus and method, and a program that are capable of more appropriately evaluating the image-capture state of a captured image.

BACKGROUND ART

Hitherto, there is a known technology for calculating an evaluation value indicating an evaluation as to whether or not an image obtained by performing image capturing using an image-capturing device has been satisfactorily captured, that is, an evaluation indicating an evaluation the image-capture state of an image.

An example of a technology for calculating an evaluation value of an image-capture state is one in which the feature quantity of each feature is extracted from the entire image, an evaluation is obtained for each feature with respect to the image, and the evaluations for each of those features is totaled, thereby calculating an overall evaluation (see, for example, NPL 1). Specifically, in the technology disclosed in NPL 1, as an evaluation for each feature, an evaluation based on the complexity of an edge, the size of a bounding box, the degree of blur, and the like is calculated.

CITATION LIST

Non Patent Literature

NPL 1: Yan Ke, Xiaoou Tang, Feng Jing "The Design of High-Level Features for Photo Quality Assessment", [online], [searched on Jun. 3, 2009], Internet <URL: http://www.cs.cmu.edu/ to yke/photoqual/cvpr06photo.pdf#search='The Design of HighLevel Features for Photo Quality Assessment'>

SUMMARY OF INVENTION

Technical Problem

However, in the above-mentioned technology, it has been difficult to appropriately evaluate the image-capture state of an image. That is, in the technology disclosed in NPL 1, the feature quantity of each feature is extracted from the entire image, and the calculation of an evaluation value is performed. Consequently, depending on the feature used for the evaluation of the image, it becomes not possible to calculate an appropriate evaluation value.

For example, in general, an image in which a background portion is simple, that is, an image in which an edge is not complex in a background portion, is assumed to have been satisfactorily captured, and is assumed to be an image having a high evaluation. Here, it is assumed that there is a typical image having a high evaluation, in which the area of a subject portion in the image is large, and the subject portion has a complex edge, but the edge in the background portion is not complex. In this case, as one feature, if an edge strength is extracted from an image and an evaluation based on the complexity of the edge is obtained, the edge is considered to be complex throughout the entire image, the obtained evaluation value becomes an evaluation lower than an evaluation that should have been originally obtained.

The present invention has been made in view of such circumstances, and aims to make it possible to more appropriately evaluate the image-capture state of an image.

Solution to Problem

An image processing apparatus according to an aspect of the present invention includes: first evaluation value calculation means for extracting a feature quantity of a first feature from the entirety of an input image, and for calculating a first partial evaluation value indicating an evaluation for the input image based on the first feature on the basis of the feature quantity of the first feature; second evaluation value calculation means for extracting a feature quantity of a second feature from a predetermined area of the input image, and for calculating a second partial evaluation value indicating an evaluation for the input image based on the second feature on the basis of the feature quantity of the second feature; and overall evaluation value calculation means for calculating an overall evaluation value indicating an evaluation of an image-capture state of the input image on the basis of the first partial evaluation value and the second partial evaluation value.

The second partial evaluation value calculation means can include subject area identification means for extracting, from respective areas of the input image, a feature quantity of a third feature possessed by an area of a subject in the input image so as to identify the area of the subject in the input image, and calculation means for extracting the feature quantity of the second feature from one of a subject area in which the subject is contained in the input image and a background area in which the subject is not contained in the input image, and for calculating the second partial evaluation value.

The calculation means can be made to extract, as the feature quantity of the second feature, a luminance value in respective areas of the subject area in the input image, and calculate the second partial evaluation value based on a distribution of the luminance values in the subject area.

The calculation means can be made to extract, as the feature quantity of the second feature, an edge strength in respective areas of the background area in the input image, and calculate the second partial evaluation value based on complexity of the edge in the background area.

The first evaluation value calculation means can be made to calculate the first partial evaluation value based on at least one of a degree of blur, a distribution of color, an average of chroma, and a variance of chroma in the entirety of the input image.

The overall evaluation value calculation means can be made to add a value that is pre-specified with respect to the value of the first partial evaluation value and a value that is pre-specified with respect to the value of the second partial evaluation value so as to calculate the overall evaluation value.

The value that is pre-specified with respect to the value of the first partial evaluation value can be determined on the basis of the first partial evaluation value of a plurality of images having different evaluations of image-capture states, the evaluations being obtained in advance, and wherein the value that is pre-specified with respect to the value of the second partial evaluation value can be determined on the basis of the second partial evaluation value of a plurality of images having different evaluations of the image-capture state, the evaluations being obtained in advance.

An image processing method or a program according to an aspect of the present invention includes the steps of: extracting a feature quantity of a first feature from the entirety of an input image, and calculating a first partial evaluation value indicating an evaluation for the input image based on the first feature on the basis of the feature quantity of the first feature; extracting a feature quantity of a second feature from a predetermined area of the input image and calculating a second partial evaluation value indicating an evaluation for the input image based on the second feature on the basis of the feature quantity of the second feature; and calculating an overall evaluation value indicating an evaluation of an image-capture state of the input image on the basis of the first partial evaluation value and the second partial evaluation value.

In an aspect of the present invention, a feature quantity of a first feature is extracted from the entirety of an input image. A first partial evaluation value indicating an evaluation for the input image based on the first feature is calculated on the basis of the feature quantity of the first feature. A feature quantity of a second feature is extracted from a predetermined area of the input image. A second partial evaluation value indicating an evaluation for the input image based on the second feature is calculated on the basis of the feature quantity of the second feature. An overall evaluation value indicating an evaluation of an image-capture state of the input image is calculated on the basis of the first partial evaluation value and the second partial evaluation value.

Advantageous Effects of Invention

According to an aspect of the present invention, it is possible to more appropriately evaluate the image-capture state of an image.

BRIEF DESCRIPTION OF DRAWINGS

FIG. 13 illustrates an example of a conversion table of blur degree scores.

DESCRIPTION OF EMBODIMENTS

A description will be given below of embodiments to which the present invention is applied, with reference to the drawings.

[Configuration of Image Processing Apparatus]

Figure 1:
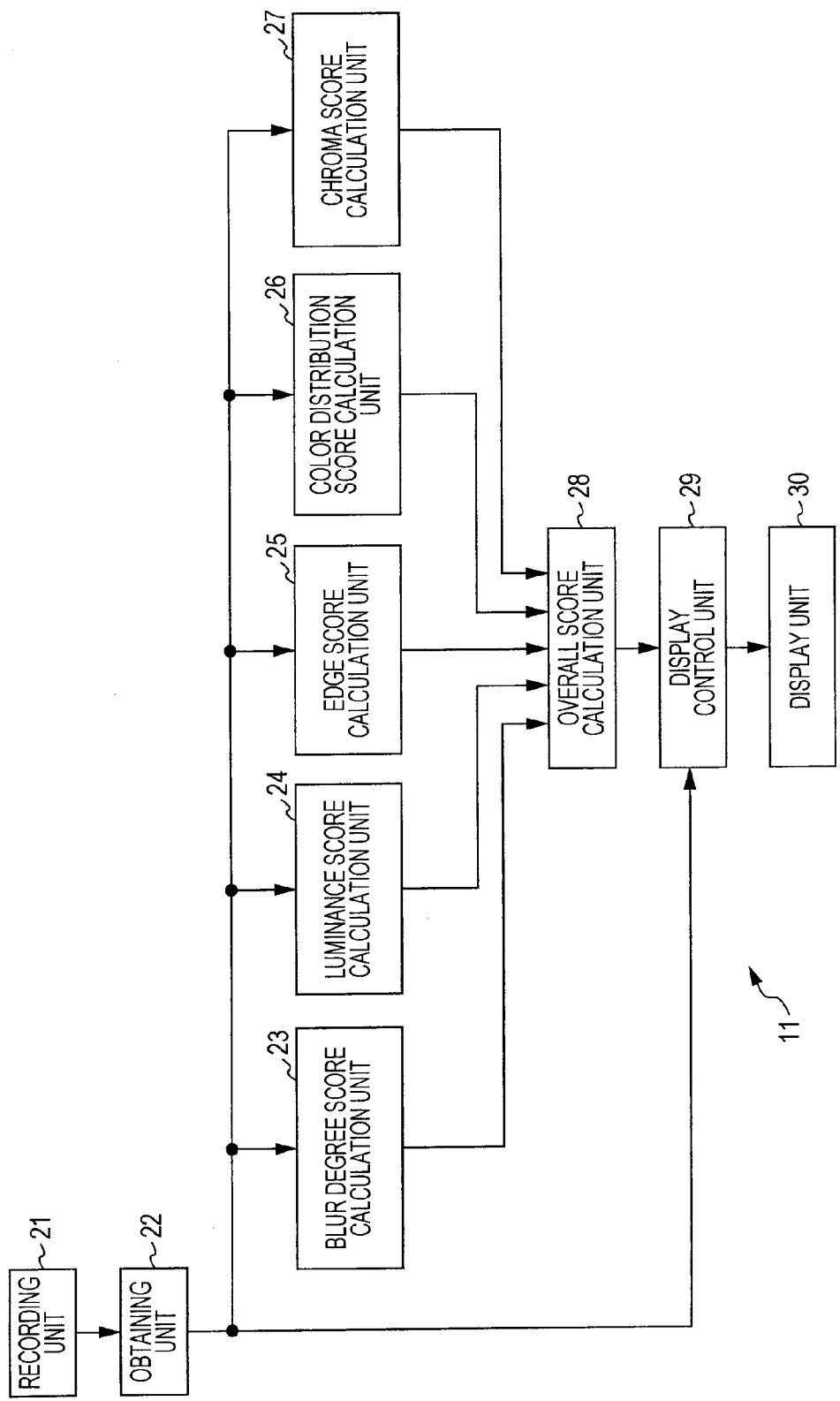
FIG. 1 illustrates an example of the configuration of an embodiment of an image processing apparatus to which the present invention is applied.

FIG. 1 illustrates an example of the configuration of an embodiment of an image processing apparatus to which the present invention is applied.

This image processing apparatus 11 calculates, with respect to an input image obtained by image capturing performed using an image-capturing device, such as, for example, a camera, an evaluation value (hereinafter referred to as an overall score) indicating an evaluation as to whether or not the input image has been satisfactorily captured, that is, the image-capture state of the input image (the appearance of the input image). It is assumed that the nearer the input image to is to an image captured by a more professional photographer, the higher the evaluation of the input image will be, and the smaller the value of the overall score of the input image will be. That is, it is assumed that the smaller the value of the overall score, the more satisfactorily the image has been captured.

The image processing apparatus 11 includes a recording unit 21, an obtaining unit 22, a blur degree score calculation unit 23, a luminance score calculation unit 24, an edge score calculation unit 25, a color distribution score calculation unit 26, a chroma score calculation unit 27, an overall score calculation unit 28, a display control unit 29, and a display unit 30.

The recording unit 21 is constituted by a hard disk or the like, and has recorded therein a plurality of input images captured by a user using an image-capturing device. For example, the input image is assumed to be an image in which each pixel has the value of R (red), G (green), and B (blue) components as a pixel value. The obtaining unit 22 obtains an input image from the recording unit 21, and supplies it to the blur degree score calculation unit 23 through to the chroma score calculation unit 27, and the display control unit 29.

The blur degree score calculation unit 23 through to the chroma score calculation unit 27 extract the feature quantity of a pre-specified feature from the input image supplied from the obtaining unit 22, and calculate a score for each feature, which indicates an evaluation with respect to the input image, based on the feature.

That is, the blur degree score calculation unit 23 extracts the edge strength from the input image as the feature quantity of the pre-specified feature, and calculate a blur degree score indicating the degree of blur of the input image on the basis of the edge strength. The luminance score calculation unit 24 extracts the luminance value from the input image as the feature quantity of the pre-specified feature, and calculates a luminance score indicating an evaluation based on the distribution of the luminance values in the subject portion (foreground portion) of the input image on the basis of the luminance value.

The edge score calculation unit 25 extracts an edge strength from the input image as the feature quantity of the pre-specified feature, and calculates an edge score representing evaluation based on the complexity of an edge in the background portion of the input image on the basis of the edge strength. The color distribution score calculation unit 26 extracts the components of each color from the input image as the feature quantity of the pre-specified feature, and calculates a color distribution score indicating an evaluation based on the distribution of the color in the input image on the basis of the component of the color.

The chroma score calculation unit 27 extracts chroma from the input image as the feature quantity of the pre-specified feature, and calculates a chroma score indicating an evaluation based on the average and the variance of the distribution of the chroma in the input image on the basis of the chroma. The blur degree score calculation unit 23 through to the chroma score calculation unit 27 supply the calculated blur degree score, luminance score, edge score, color distribution score, and chroma score to the overall score calculation unit 28.

Hereinafter, when there is no particular need to distinguish among the blur degree score, the luminance score, the edge score, the color distribution score, and the chroma score, these will also be simply referred to as a feature-by-feature score.

The overall score calculation unit 28 calculates an overall score on the basis of the feature-by-feature score supplied from the blur degree score calculation unit 23 through to the chroma score calculation unit 27, and supplies the overall score to the display control unit 29. On the basis of the overall score from the overall score calculation unit 28, the display control unit 29 selects several input images having a high evaluation among the input images supplied from the obtaining unit 22. Furthermore, the display control unit 29 supplies the selected input image to the display unit 30 so as to control the display of the input image. The display unit 30 is formed of, for example, a liquid-crystal display, and displays an input image under the control of the display control unit 29.

[Configuration of Blur Degree Score Calculation Unit]

Figure 2:
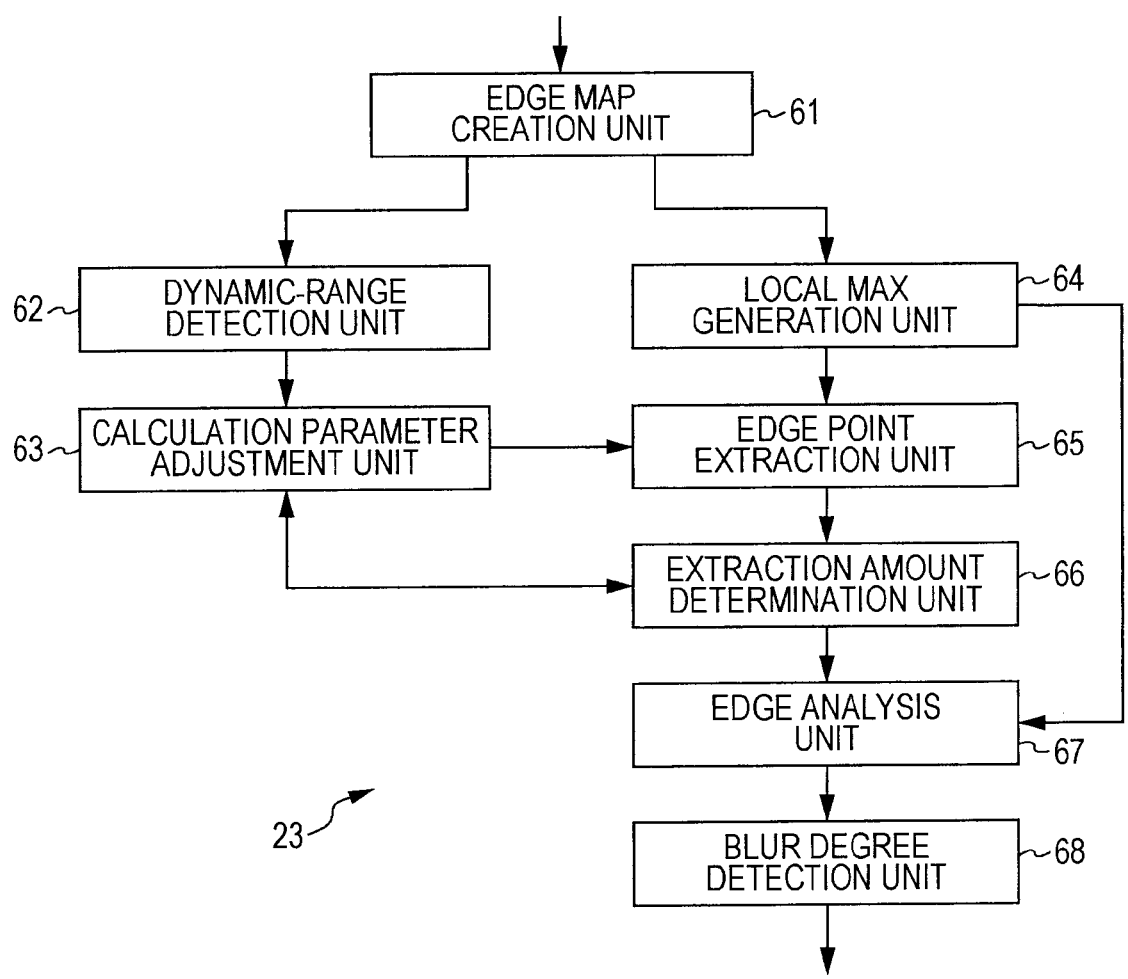
FIG. 2 illustrates an example of the configuration of a blur degree score calculation unit.

Furthermore, the blur degree score calculation unit 23 of FIG. 1 is, in more detail, configured as shown in FIG. 2.

That is, the blur degree score calculation unit 23 includes an edge map creation unit 61, a dynamic-range detection unit 62, a calculation parameter adjustment unit 63, a local max generation unit 64, an edge point extraction unit 65, an extraction amount determination unit 66, an edge analysis unit 67, and a blur degree detection unit 68.

On the basis of the input image supplied from the obtaining unit 22, the edge map creation unit 61 detects a strength of an edge (edge strength) of an input image in units of blocks of three types having mutually different sizes, and creates an edge map in which the detected edge strength is a pixel value. This edge map is created for each size of the block, and starting in sequence from a small block, the edge maps are set as edge maps of a scale SC1 to a scale SC3. The edge map creation unit 61 supply these created three edge maps to the dynamic-range detection unit 62 and the local max generation unit 64.

The dynamic-range detection unit 62 detects a dynamic range, which is a difference between the maximum value and the minimum value of the edge strength of the input image by using the edge map from the edge map creation unit 61, and supplies the detection result to the calculation parameter adjustment unit 63.

On the basis of the detection result supplied from the dynamic-range detection unit 62, the calculation parameter adjustment unit 63 adjusts a calculation parameter used for the extraction of an edge point so that the extraction amount of the edge point (hereinafter will also be referred to as an edge point extraction amount) used to detect the degree of blur of the input image becomes an appropriate value. Here, the term "edge point" refers to a pixel forming the edge in the image.

Furthermore, the calculation parameter contains an extraction reference value used for determination as to whether or not the edge reference value used for determination of whether or not the edge point is an edge point, and whether or not the edge point extraction amount is appropriate. The calculation parameter adjustment unit 63 supplies the edge reference value to the edge point extraction unit 65 and the extraction amount determination unit 66, and supplies the extraction reference value to the extraction amount determination unit 66.

The local max generation unit 64 divides each of the edge maps supplied from the edge map creation unit 61 into blocks of a predetermined size, and extracts the maximum value of the pixel value of each block, thereby generating a local max. The local max is generated for each scale of the edge map, and is supplied from the local max generation unit 64 to the edge point extraction unit 65 and the edge analysis unit 67. Hereinafter, the local maxes generated from the edge maps of the scale SC1 through to the scale SC3 will be referred to as a local max LM1 through to a local max LM3, respectively.

The edge point extraction unit 65 extracts an edge point from the input image on the basis of the edge reference value from the calculation parameter adjustment unit 63 and the local max from the local max generation unit 64. Furthermore, the edge point extraction unit 65 generates an edge point table indicating the information of the extracted edge point, and supplies the edge point table to the extraction amount determination unit 66. Meanwhile, the edge point tables obtained from the local max LM1 through to the local max LM3, respectively, will be referred to as an edge point table ET1 to an edge point table ET3, respectively.

The extraction amount determination unit 66 determines whether or not the edge point extraction amount is appropriate on the basis of the edge point table from the edge point extraction unit 65 and the extraction reference value from the calculation parameter adjustment unit 63. In a case where the edge point extraction amount is not appropriate, the extraction amount determination unit 66 notifies the calculation parameter adjustment unit 63 of the fact that the edge point extraction amount is not appropriate. In a case where the edge point extraction amount is appropriate, the extraction amount determination unit 66 supplies the edge reference value and the edge point table at that time to the edge analysis unit 67.

The edge analysis unit 67 performs the analysis of the edge point of the input image on the basis of the edge point table from the extraction amount determination unit 66, and supplies the analysis result to the blur degree detection unit 68. On the basis of the analysis result and the edge point, the blur degree detection unit 68 detects the degree of blur that is an index indicating the degree of blur of the input image, and supplies the degree of blur as a blur degree score to the overall score calculation unit 28.

[Configuration of Luminance Score Calculation Unit]

Figure 3:
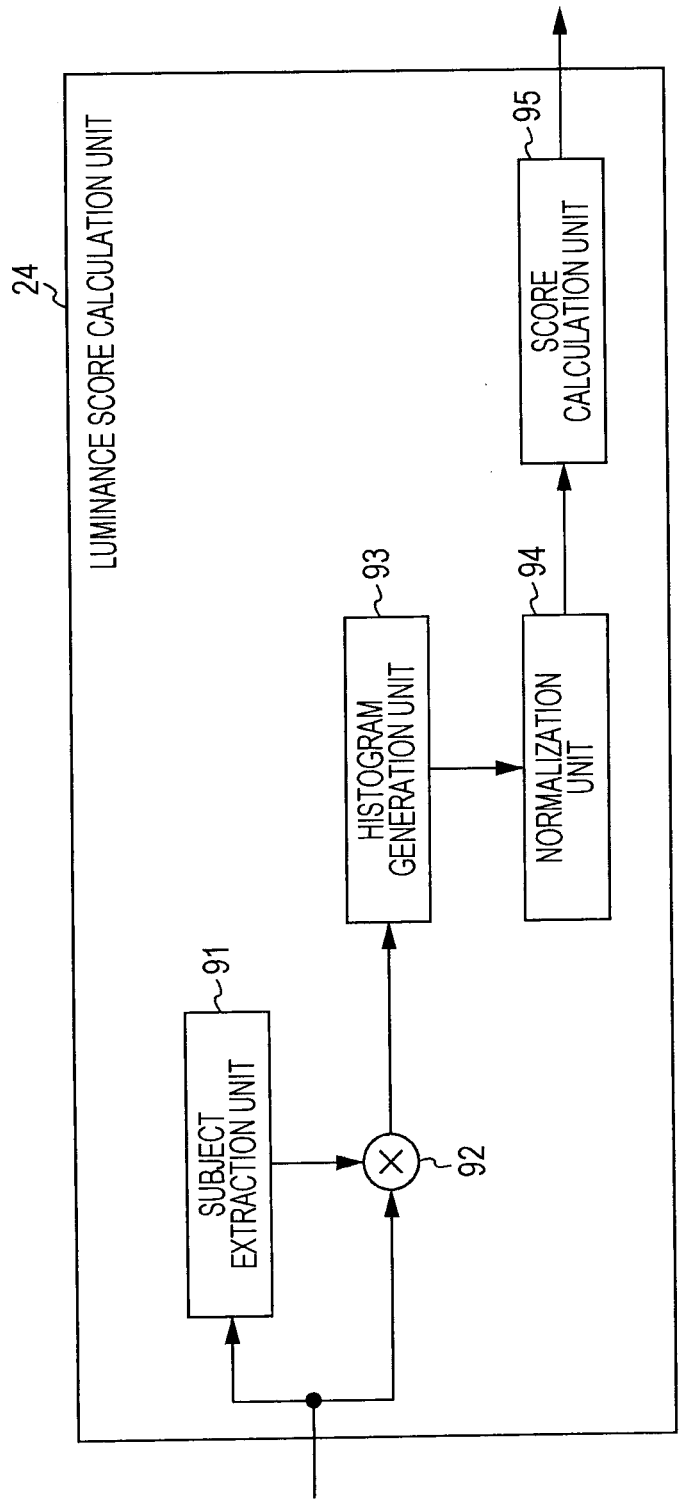
FIG. 3 illustrates an example of the configuration of a luminance score calculation unit.

Furthermore, the luminance score calculation unit 24 of FIG. 1 is, in more detail, configured as shown in FIG. 3.

That is, the luminance score calculation unit 24 is constituted by a subject extraction unit 91, a multiplication unit 92, a histogram generation unit 93, a normalization unit 94, and a score calculation unit 95. The input image from the obtaining unit 22 is supplied to the subject extraction unit 91 and the multiplication unit 92.

On the basis of the input image supplied from the obtaining unit 22, the subject extraction unit 91 creates a subject map for extracting a subject-containing area in the input image, and supplies the subject map to the multiplication unit 92.

For example, the pixel value of the pixel of the subject map is set to "1" in a case where the area of the input image at the same position as that of the pixel is estimated to be a subject-containing area, and is set to "0" in a case where the area of the input image at the same position as that of the pixel is estimated to be an area in which the subject is not contained. Furthermore, the subject referred to herein is assumed to be an object body in the input image to which the user pays notice in a case where the user casts a quick glance at the input image, that is, an object body to which the user is estimated to turn his/her attention. Therefore, the subject is not necessarily limited to a person.

By multiplying the pixel value of the pixel of the input image from the obtaining unit 22 by the pixel value of the pixel of the subject map from the subject extraction unit 91, the multiplication unit 92 generates a subject image that is the image of the area of the subject in the input image, and supplies the subject image to the histogram generation unit 93. In the subject image, the pixel value of the pixel of the subject portion becomes the same value as the pixel value of the pixel of the input image at the same position as that of the pixel. In the subject image, the pixel value of the pixel of the background portion in which the subject is not contained is set to 0. That is, the multiplication process in the multiplication unit 92 makes it possible to identify (extract) the area of the subject in the input image, and a subject image formed from the portion of the subject is generated.

On the basis of the subject image from the multiplication unit 92, the histogram generation unit 93 generates a histogram of the luminance values of the subject image, and supplies the histogram to the normalization unit 94. The normalization unit 94 normalizes the histogram from the histogram generation unit 93 and supplies it to the score calculation unit 95. Furthermore, on the basis of the histogram supplied from the normalization unit 94, the score calculation unit 95 calculates a luminance score and supplies it to the overall score calculation unit 28.

[Configuration of Subject Extraction Unit]

Figure 4:
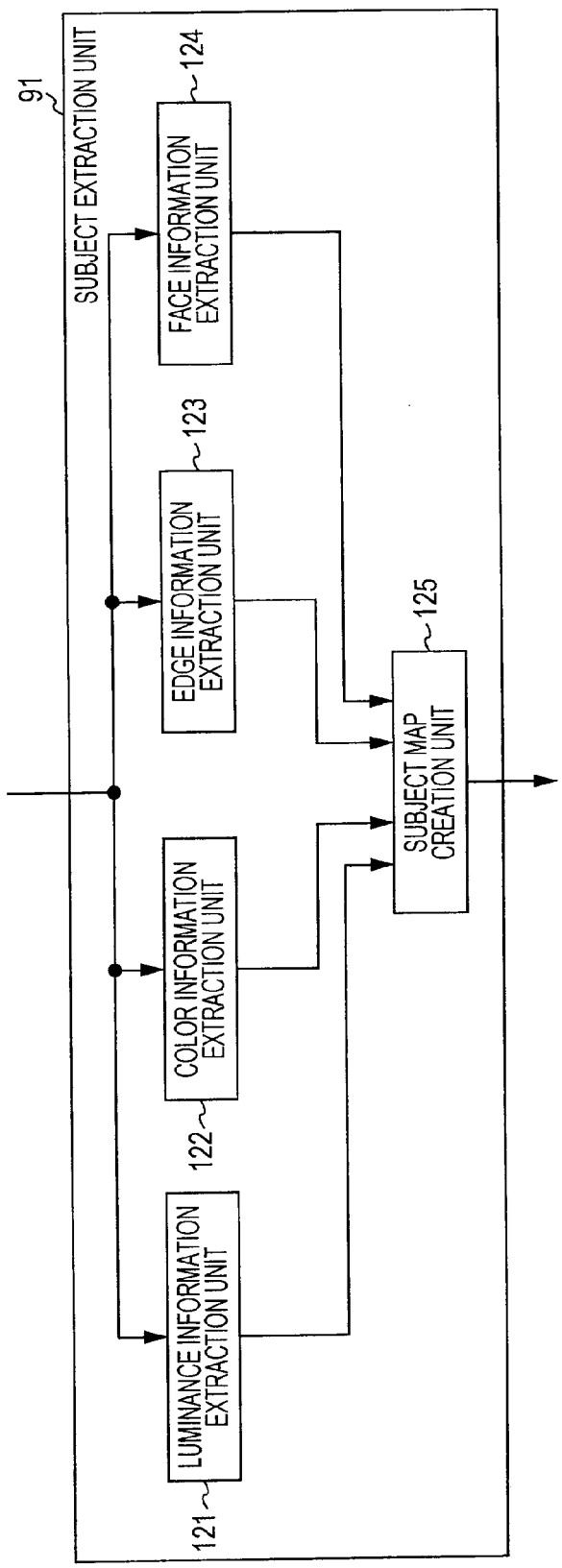
FIG. 4 illustrates an example of the configuration of a subject extraction unit.

Here, the subject extraction unit 91 of FIG. 3 is, in more detail, configured as shown in FIG. 4.

That is, the subject extraction unit 91 is constituted by a luminance information extraction unit 121, a color information extraction unit 122, an edge information extraction unit 123, a face information extraction unit 124, and a subject map creation unit 125. Furthermore, the input image from the obtaining unit 22 is supplied to the luminance information extraction unit 121 through to the face information extraction unit 124 of the subject extraction unit 91.

The luminance information extraction unit 121 through to the face information extraction unit 124 extract the feature quantities of features possessed by the area of the subject from the input image supplied from the obtaining unit 22, and creates an information map indicating the likelihood of the area being the subject in respective areas of the input image.

Specifically, the luminance information extraction unit 121 extracts a luminance value from the input image, creates a luminance information map indicating the information regarding luminance in respective areas of the input image, and supplies the luminance information map to the subject map creation unit 125. The color information extraction unit 122 extracts the components of a predetermined color from the input image, creates a color information map indicating the information regarding the color in respective areas of the input image, and supplies the color information map to the subject map creation unit 125.

The edge information extraction unit 123 extracts an edge strength from the input image, creates an edge information map indicating the information regarding an edge in respective areas of the input image, and supplies the edge information map to the subject map creation unit 125. The face information extraction unit 124 extracts the feature quantity of the feature possessed by the face of the person from the input image, creates a face information map indicating the information regarding the face of the person as a subject in respective areas of the input image, and supplies the face information map to the subject map creation unit 125.

Meanwhile, hereinafter, in a case where the luminance information map through to the face information map, which are output from the luminance information extraction unit 121 through to the face information extraction unit 124, do not need to be individually distinguished, they will also be referred to simply as an information map. The information contained in these information maps is information indicating the feature quantities of the features that are contained to a greater degree in the area in which the subject is contained, and the information that is arranged in such a manner as to correspond to respective areas of the input image is made to be an information map. That is, the information map may be said to be information indicating the feature quantity in respective areas of the input image.

Therefore, an area of the input image corresponding to an area having an amount of information to a greater degree, that is, an area having more feature quantities is an area having a high probability of containing the subject to a greater degree, thereby making it possible to identify an area in which the subject in the input image is contained on the basis of each information map.

The subject map creation unit 125 linearly combines the information maps supplied from the luminance information extraction unit 121 through to the face information extraction unit 124 so as to create a subject map. That is, the information (feature quantity) of respective areas of the luminance information map through to the face information map is subjected to weighted addition for each area at the same position, forming a subject map. The subject map creation unit 125 supplies the created subject map to the multiplication unit 92.

[Configuration of Luminance Information Extraction Unit]

Next, with reference to FIGS. 5 to 8, a more detailed configuration of the luminance information extraction unit 121 through to the face information extraction unit 124 of FIG. 4 will be described.

Figure 5:
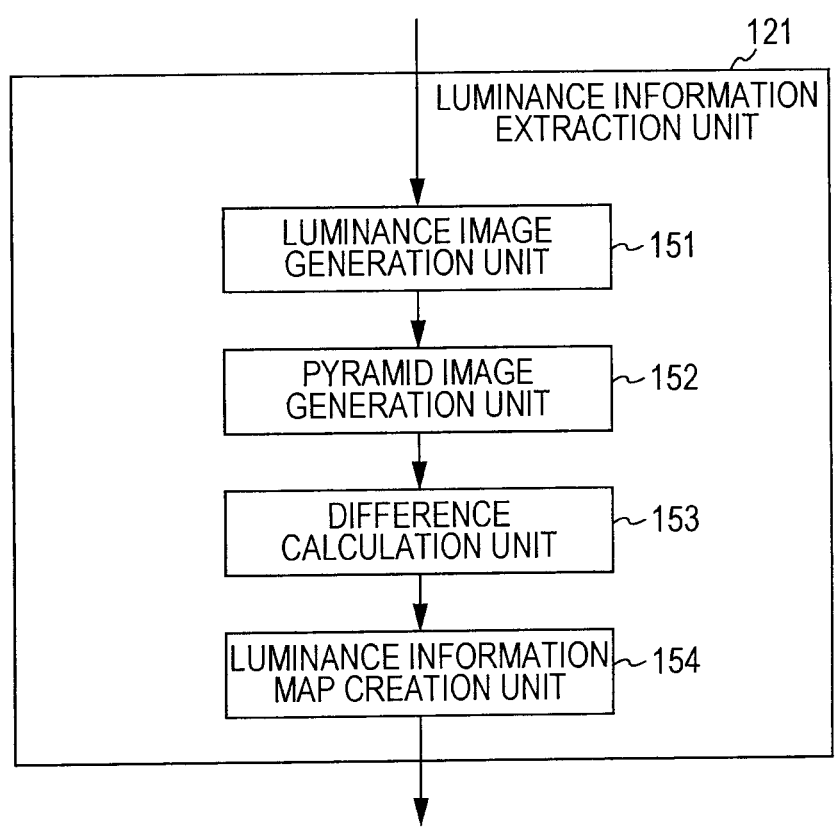
FIG. 5 illustrates an example of the configuration of a luminance information extraction unit.

FIG. 5 illustrates an example of a more detailed configuration of the luminance information extraction unit 121.

The luminance information extraction unit 121 is constituted by a luminance image generation unit 151, a pyramid image generation unit 152, a difference calculation unit 153, and a luminance information map creation unit 154.

The luminance image generation unit 151 generates a luminance image in which the luminance value of the pixel of the input image is the pixel value of the pixel by using the input image supplied from the obtaining unit 22, and supplies the luminance image to the pyramid image generation unit 152. Here, the pixel value of an arbitrary pixel of the luminance image indicates the luminance value of the pixel of the input image at the same position as that of the arbitrary pixel.

The pyramid image generation unit 152 generates a plurality of luminance images having mutually different resolutions by using the luminance image supplied from the luminance image generation unit 151, and supplies those luminance images as pyramid images of luminance to the difference calculation unit 153.

For example, pyramid images L1 to L7 of hierarchies of eight resolutions from the level L1 to the level L8 are generated. The pyramid image L1 of the level L1 has the highest resolution, and the resolutions of the pyramid images are assumed to be set so as to be sequentially decreased in the order from the level L1 to the level L8.

In this case, the luminance image generated by the luminance image generation unit 151 is set as the pyramid image of the level L1. Furthermore, the average value of the pixel values of four mutually adjacent pixels in the pyramid image of the level Li (where $1 \leq i \leq 7$) is set as the pixel value of one pixel of the pyramid image at the level L (i+1) corresponding to those pixels. Therefore, the pyramid image of the level L (i+1) will become an image of a size that is vertically and horizontally half (discarded when not exactly divisible) that of the pyramid image of the level Li.

The difference calculation unit 153 selects two pyramid images of different hierarchies among the plurality of pyramid images supplied from the pyramid image generation unit 152, and obtains the difference of the selected pyramid images so as to generate a difference image of luminance. Meanwhile, since the sizes (number of pixels) of the pyramid images of each hierarchy differ from each other, when the difference images are to be generated, the smaller pyramid image is up-converted in accordance with the larger pyramid image.

When the difference calculation unit 153 generates a pre-specified number of difference images of luminance, the difference calculation unit 153 normalizes those generated difference images, and supplies them to the luminance information map creation unit 154. The luminance information map creation unit 154 creates a luminance information map on the basis of the difference images supplied from the difference calculation unit 153, and supplies the luminance information map to the subject map creation unit 125.

[Configuration of Color Information Extraction Unit]

Figure 6:
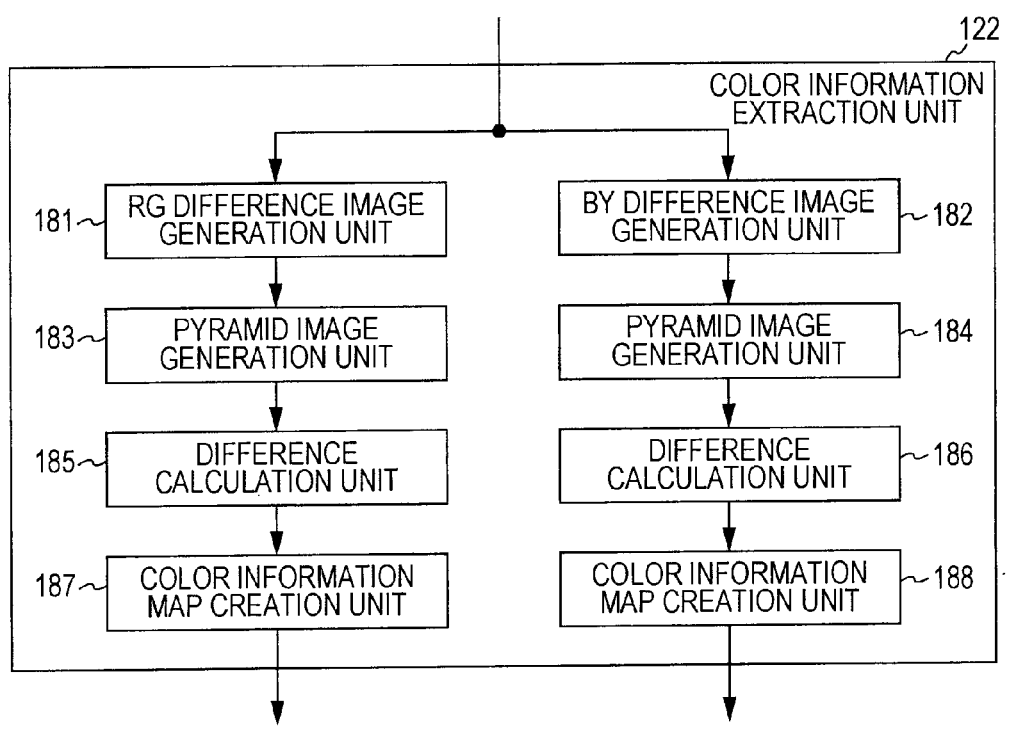
FIG. 6 illustrates an example of the configuration of a color information extraction unit.

FIG. 6 illustrates an example of a more detailed configuration of the color information extraction unit 122 of FIG. 4.

The color information extraction unit 122 is constituted by an RG difference image generation unit 181, a BY difference image generation unit 182, a pyramid image generation unit 183, a pyramid image generation unit 184, a difference calculation unit 185, a difference calculation unit 186, a color information map creation unit 187, and a color information map creation unit 188.

By using the input image supplied from the obtaining unit 22, the RG difference image generation unit 181 generates an RG difference image in which the difference between R (red) components and G (green) components is the pixel value of the pixel of the input image, and supplies the RG difference image to the pyramid image generation unit 183. The pixel value of an arbitrary pixel of the RG difference image indicates the value of the difference between R components and G components of the pixel of the input image at the same position as that of the arbitrary pixel.

By using the input image supplied from the obtaining unit 22, the BY difference image generation unit 182 generates a BY difference image in which the difference between B (blue) components and Y (yellow) components is the pixel value of the pixel of the input image, and supplies the BY difference image to the pyramid image generation unit 184. The pixel value of an arbitrary pixel of the BY difference image indicates the value of the difference between B (blue) components and Y (yellow) components of the pixel of the input image at the same position as that of the arbitrary pixel.

The pyramid image generation unit 183 and the pyramid image generation unit 184 generate a plurality of RG difference images and BY difference images having mutually different resolutions by using the RG difference image and the BY difference image supplied from the RG difference image generation unit 181 and the BY difference image generation unit 182, respectively. Then, the pyramid image generation unit 183 and the pyramid image generation unit 184 supply the generated RG difference image and BY difference image as a pyramid image of the difference of RG and a pyramid image of the difference of BY to the difference calculation unit 185 and the difference calculation unit 186, respectively.

For example, as pyramid images of the difference of RG and pyramid images of the difference of BY, similarly to the case of the pyramid image of luminance, pyramid images of hierarchies of eight resolutions from the level L1 to the level L8 are generated correspondingly.

The difference calculation unit 185 and the difference calculation unit 186 select two pyramid images having mutually different hierarchies among the plurality of pyramid images supplied from the pyramid image generation unit 183 and the pyramid image generation unit 184, and obtain the difference of the selected pyramid images so as to generate a difference image of the difference of RG and a difference image of the difference of BY. Meanwhile, since the sizes of the pyramid images of each hierarchy are different from each other, when a difference image is to be generated, the smaller pyramid image is up-converted so that it will have the same size as that of the larger pyramid image.

When the difference calculation unit 185 and the difference calculation unit 186 generate a pre-specified number of difference images of the difference of RG and difference images of the difference of BY, the difference calculation unit 185 and the difference calculation unit 186 normalize those generated difference images and supplies them to the color information map creation unit 187 and the color information map creation unit 188. The color information map creation unit 187 and the color information map creation unit 188 create a color information map on the basis of the difference images supplied from the difference calculation unit 185 and the difference calculation unit 186, and supply them to the subject map creation unit 125. In the color information map creation unit 187, a color information map of the difference of RG is created, and in the color information map creation unit 188, a color information map of the difference of BY is created.

[Configuration of Edge Information Extraction Unit]

Figure 7:
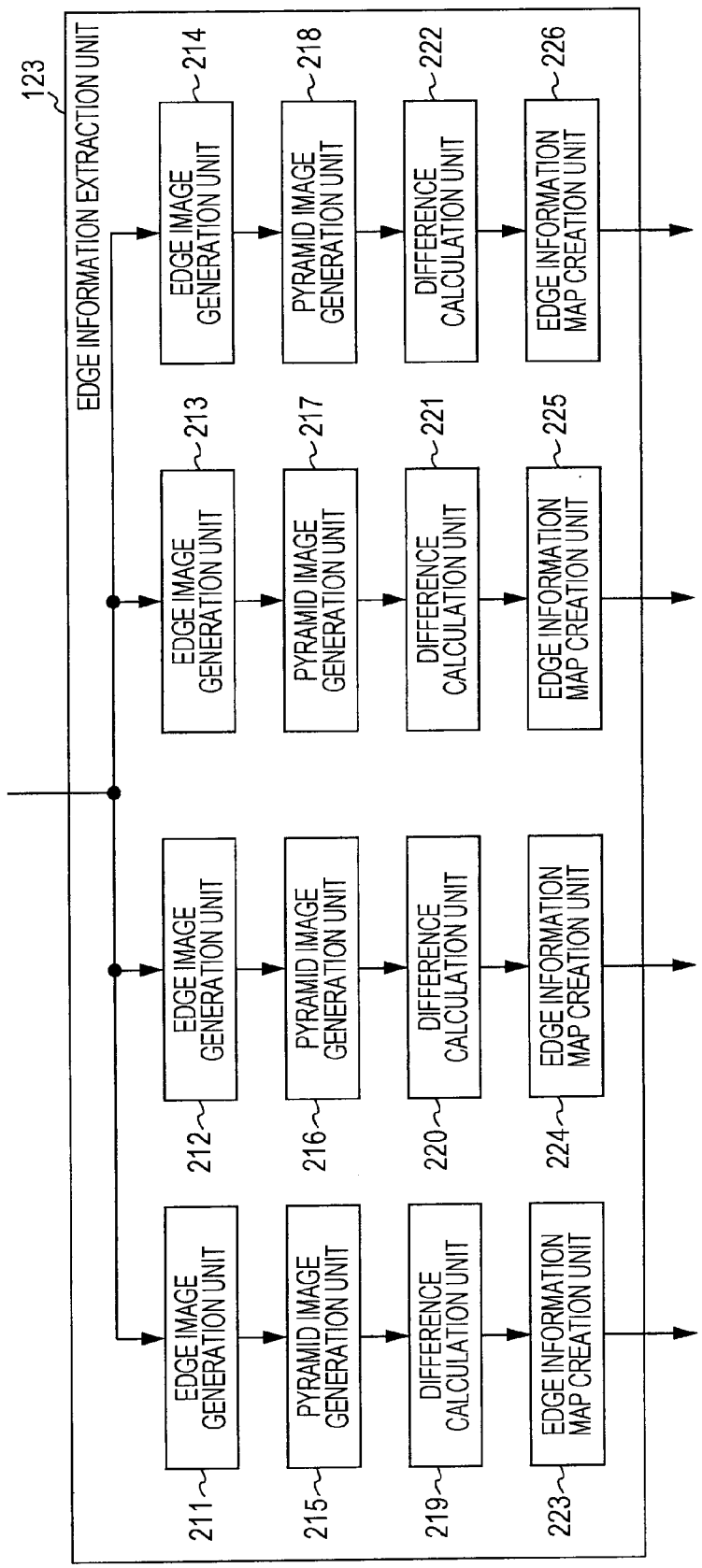
FIG. 7 illustrates an example of the configuration of an edge information extraction unit.

FIG. 7 illustrates an example of a more detailed configuration of the edge information extraction unit 123 of FIG. 4.

The edge information extraction unit 123 is constituted by an edge image generation unit 211 through to an edge image generation unit 214, a pyramid image generation unit 215 through to a pyramid image generation unit 218, a difference calculation unit 219 through to a difference calculation unit 222, and an edge information map creation unit 223 through to an edge information map creation unit 226.

The edge image generation unit 211 through to the edge image generation unit 214 perform a filtering process using a Gabor filter on the input image supplied from the obtaining unit 22, generate edge images in which edge strengths in the direction of, for example, 0 degrees, 45 degrees, 90 degrees, and 135 degrees are the pixel values of the pixel, and supplies them to the pyramid image generation unit 215 through to the pyramid image generation unit 218, respectively.

For example, the pixel value of an arbitrary pixel of the edge image generated by the edge image generation unit 211 indicates the edge strength in the direction of 0 degrees in the pixel of the input image at the same position as that of arbitrary pixel. Meanwhile, the direction of each edge refers to a direction indicated by the angle components in a Gabor function forming a Gabor filter.

The pyramid image generation unit 215 through to the pyramid image generation unit 218 generate a plurality of edge images having mutually different resolutions by using the edge image of each direction supplied from the edge image generation unit 211 through to the edge image generation unit 214, respectively. Then, the pyramid image generation unit 215 through to the pyramid image generation unit 218 supply those generated edge images of the respective directions as the pyramid images of the respective directions of edge to the difference calculation unit 219 through to the difference calculation unit 222, respectively.

For example, as pyramid images of each direction of edge, similarly to the case of the pyramid image of luminance, pyramid images of eight hierarchies from the level L1 to the level L8 are generated correspondingly.

The difference calculation unit 219 through to the difference calculation unit 222 select two pyramid images of mutually different hierarchies among the plurality of pyramid images supplied from the pyramid image generation unit 215 through to the pyramid image generation unit 218, and obtain the difference of the selected pyramid images so as to generate a difference image of each direction of the edge. Meanwhile, since the pyramid images of each hierarchy have mutually different sizes, when a difference image is to be generated, the smaller pyramid image is up-converted.

When the difference calculation unit 219 through to the difference calculation unit 222 generate a pre-specified number of difference images of each direction of edge, they normalize those generated difference images, and supplies them to the edge information map creation unit 223 through to the edge information map creation unit 226, respectively. On the basis of the difference images supplied from the difference calculation unit 219 through to the difference calculation unit 222, the edge information map creation unit 223 through to the edge information map creation unit 226 create edge information maps of each direction, and supply them to the subject map creation unit 125.

[Configuration of Face Information Extraction Unit]

Figure 8:
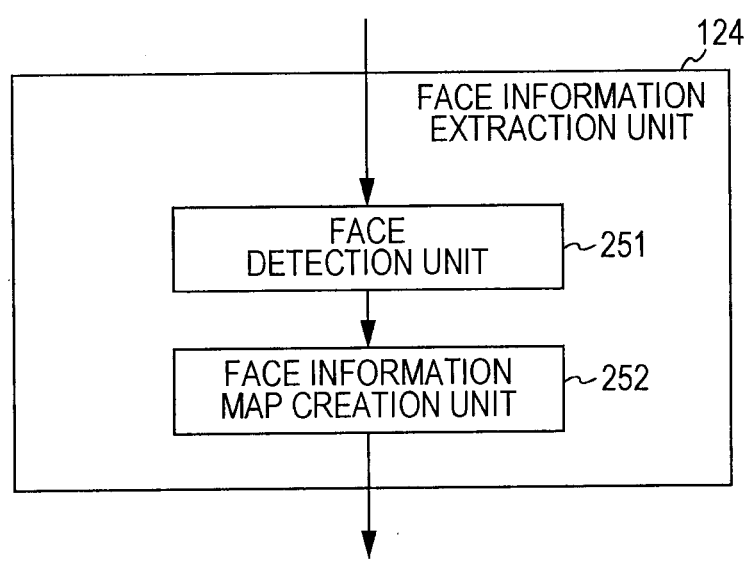
FIG. 8 illustrates an example of the configuration of a face information extraction unit.

FIG. 8 illustrates an example of a more detailed configuration of the face information extraction unit 124 of FIG. 4.

The face information extraction unit 124 is constituted by a face detection unit 251 and a face information map creation unit 252.

The face detection unit 251 detects the area of the face of a person as a subject from the input image supplied from the obtaining unit 22, and supplies the detection result to the face information map creation unit 252. The face information map creation unit 252 creates a face information map on the basis of the detection result from the face detection unit 251 and supplies the face information map to the subject map creation unit 125.

[Configuration of Edge Score Calculation Unit]

Figure 9:
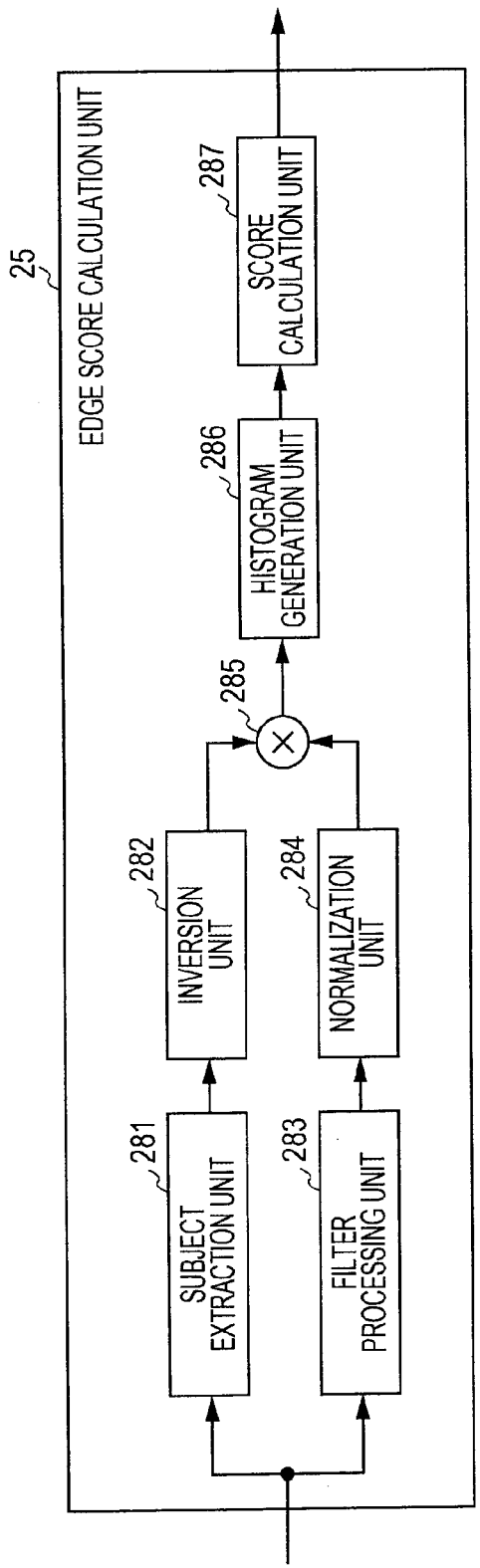
FIG. 9 illustrates an example of the configuration of an edge score calculation unit.

In addition, the edge score calculation unit 25 of FIG. 1 is, in more detail, configured as shown in FIG. 9.

That is, the edge score calculation unit 25 is constituted by a subject extraction unit 281, an inversion unit 282, a filter processing unit 283, a normalization unit 284, a multiplication unit 285, a histogram generation unit 286, and a score calculation unit 287.

The subject extraction unit 281 creates a subject map on the basis of the input image supplied from the obtaining unit 22, and supplies the subject map to the inversion unit 282. Meanwhile, since this subject extraction unit 281 has a configuration identical to that of the subject extraction unit 91 of FIG. 4, the description thereof is omitted.

The inversion unit 282 inverts the pixel value of the pixel of the subject map supplied from the subject extraction unit 281 and supplies the pixel value to the multiplication unit 285. That is, in the subject map, the pixel whose pixel value is 1 is set to a pixel value of 0, and in contrast, the pixel whose pixel value is 0 is set to a pixel value of 1. Therefore, the pixel value of the pixel of the subject map after inversion is set to "0" when the area of the input image at the same position as that of the pixel is an area in which the subject is estimated to be contained, and is set to "1" when the area of the input image at the same position as that of the pixel is an area in which the subject is estimated not to be contained. That is, the subject map after inversion is a map for identifying a background area in which the subject in the input image is not contained.

The filter processing unit 283 performs a filtering process using a Laplacian filter on the input image supplied from the obtaining unit 22 so as to generate a Laplacian image in which the edge strength in respective areas of the input image is the pixel value of the pixel, and supplies the Laplacian image to the normalization unit 284. The normalization unit 284 normalizes the Laplacian image from the filter processing unit 283 and supplies the Laplacian image to the multiplication unit 285.

The multiplication unit 285 multiplies the pixel value of the pixel of the Laplacian image from the normalization unit 284 by the pixel value of the pixel of the inverted subject map from the inversion unit 282 so as to generate a background image that is an image of the area of the background in the input image, and supplies the background image to the histogram generation unit 286. In the background image, the pixel value of the pixel of the background portion in which the subject is not contained has the same value as the pixel value of the pixel of the Laplacian image at the same position as that of the pixel of the background portion. In the background image, the pixel value of the pixel of the subject portion becomes 0. That is, the multiplication process in the multiplication unit 285 allows the area of the background in the input image to be identified (extracted), and a background image formed from the edge strength in the background portion is generated.

On the basis of the background image from the multiplication unit 285, the histogram generation unit 286 generates the histogram of the edge strengths of the background image, and supplies the histogram to the score calculation unit 287. The score calculation unit 287 calculates an edge score on the basis of the histogram from the histogram generation unit 286 and supplies the edge score to the overall score calculation unit 28.

[Configuration of Color Distribution Score Calculation Unit]

Figure 10:
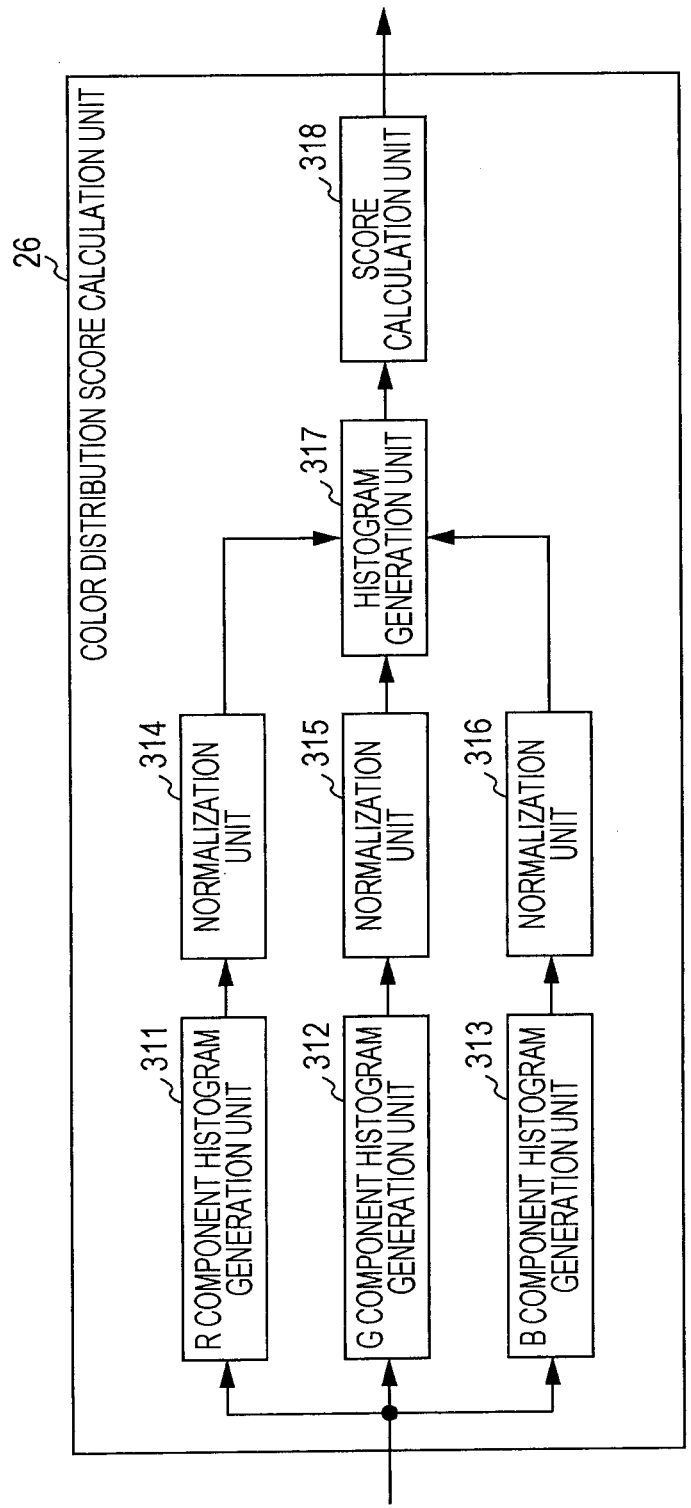
FIG. 10 illustrates an example of the configuration of a color distribution score calculation unit.

Furthermore, the color distribution score calculation unit 26 of FIG. 1 is, in more detail, configured as shown in FIG. 10.

That is, the color distribution score calculation unit 26 is constituted by an R component histogram generation unit 311, a G component histogram generation unit 312, a B component histogram generation unit 313, a normalization unit 314 through to a normalization unit 316, a histogram generation unit 317, and a score calculation unit 318.

The R component histogram generation unit 311 through to the B component histogram generation unit 313 generate histograms of each component of R (red), G (green), and B (blue) from the input image supplied from the obtaining unit 22, and supplies them to the normalization unit 314 through to the normalization unit 316, respectively. The normalization unit 314 through to the normalization unit 316 normalize the histograms for each component from the R component histogram generation unit 311 through to the B component histogram generation unit 313, respectively, and supplies them to the histogram generation unit 317.

By using the histogram for each color component supplied from the normalization unit 314 through to the normalization unit 316, the histogram generation unit 317 generates one histogram in which the range of the value of one color is a bin composed of each component of R, G, and B, and supplies the histogram to the score calculation unit 318. The score calculation unit 318 calculates a color distribution score on the basis of the histogram supplied from the histogram generation unit 317, and supplies the color distribution score to the overall score calculation unit 28.

[Configuration of Chroma Score Calculation Unit]

Figure 11:
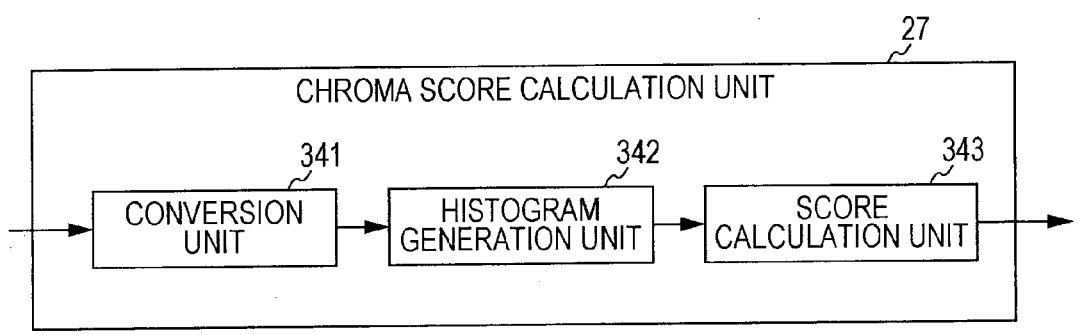
FIG. 11 illustrates an example of the configuration of a chroma score calculation unit.

In addition, the chroma score calculation unit 27 of FIG. 1 is, in more detail, configured as shown in FIG. 11.

That is, the chroma score calculation unit 27 is constituted by a conversion unit 341, a histogram generation unit 342, and a score calculation unit 343.

The conversion unit 341 converts the input image formed from each component of R, G, and B supplied from the obtaining unit 22 into an input image composed of the value of each component of H (hue), S (chroma), and V (brightness), and supplies the input image to the histogram generation unit 342.

The histogram generation unit 342 generates a histogram of the components of the chroma of the pixel that satisfies specific conditions among the pixels of the input image supplied from the conversion unit 341, and supplies the histogram to the score calculation unit 343. The score calculation unit 343 calculates a chroma score on the basis of the histogram from the histogram generation unit 342, and supplies the chroma score to the overall score calculation unit 28.

[Description Of Slideshow Display Process]

By the way, when a user operates the image processing apparatus 11 of FIG. 1, specifies a plurality of input images recorded in the recording unit 21, and instructs a slideshow display of those input images, the image processing apparatus 11 starts a slideshow display process in response to the instruction of the user.

A description will be given below, with reference to the flowchart of FIG. 12, of a slideshow display process by the image processing apparatus 11.

In step S11, the obtaining unit 22 obtains one of the input images specified by the user from the recording unit 21, and supplies the input images to the blur degree score calculation unit 23 through to the chroma score calculation unit 27, and the display control unit 29.

For example, when the user specifies a folder recorded in the recording unit 21 and instructs a slideshow display of the input images stored in the folder, the obtaining unit 22 obtains one input image within the folder specified by the user. Meanwhile, the term "slideshow display of the input image" refers to a process for sequentially displaying a plurality of input images.

In step S12, the blur degree score calculation unit 23 performs a blur degree calculation process so as to calculate a blur degree score with respect to the input image, and supplies the blur degree score to the overall score calculation unit 28. Furthermore, in step S13, the luminance score calculation unit 24 performs a luminance score calculation process so as to calculate a luminance score for the input image, and supplies the luminance score to the overall score calculation unit 28.

In step S14, the edge score calculation unit 25 performs an edge score calculation process so as to calculate an edge score for the input image, and supplies it to the overall score calculation unit 28. In step S15, the color distribution score calculation unit 26 performs a color distribution score calculation process so as to calculate a color distribution score for the input image, and supplies the color distribution score to the overall score calculation unit 28.

In addition, in step S16, the chroma score calculation unit 27 performs a chroma score calculation process so as to calculate a chroma score for the input image, and supplies the chroma score to the overall score calculation unit 28.

Meanwhile, the details of the blur degree calculation process through to the chroma score calculation process performed in steps S12 to S16 will be described later.

In step S17, the overall score calculation unit 28 calculates an overall score for the input image on the basis of the feature-by-feature score supplied from the blur degree score calculation unit 23 through to the chroma score calculation unit 27.

That is, by using a conversion table held in advance for each feature-by-feature score, the overall score calculation unit 28 converts the value of the feature-by-feature score to a pre-specified score point for the value of the feature-by-feature score, and sets the total (sum total) of the score points obtained for each feature-by-feature score as an overall score.

For example, when it is assumed that the value that the blur degree score as a feature-by-feature score can take is 0 to 1 and the greater the value of the blur degree score, the more the entire input image is blurred, the overall score calculation unit 28 obtains the score point of the blur degree score on the basis of the conversion table of the blur degree score shown in FIG. 13.

That is, when the blur degree score is less than 0.2, the score point of the blur degree score is set to 0, when the blur degree score is greater than or equal to 0.2 and less than 0.3, the score point of the blur degree score is set to 1, and when the blur degree score is greater than or equal to 0.3 and less than 0.5, the score point of the blur degree score is set to 2.

Furthermore, when the blur degree score is greater than or equal to 0.5 and less than 0.7, the score point of the blur degree score is set to 3, when the blur degree score is greater than or equal to 0.7 and less than 0.9, the score point of the blur degree score is set to 5, and when the blur degree score greater than or equal to 0.9, the score point of the blur degree score is set to 10.

Here, the score point determined with respect to each range of the value of the blur degree score is determined on the basis of the blur degree score obtained from a professional image and an amateur image that are prepared in advance. Meanwhile, the term "professional image" refers to an image having a generally high evaluation (satisfactorily captured), which has been captured by a professional photographer, and the amateur image refers to an image having a generally low evaluation (poorly captured), which is captured by an amateur.

Figure 14:
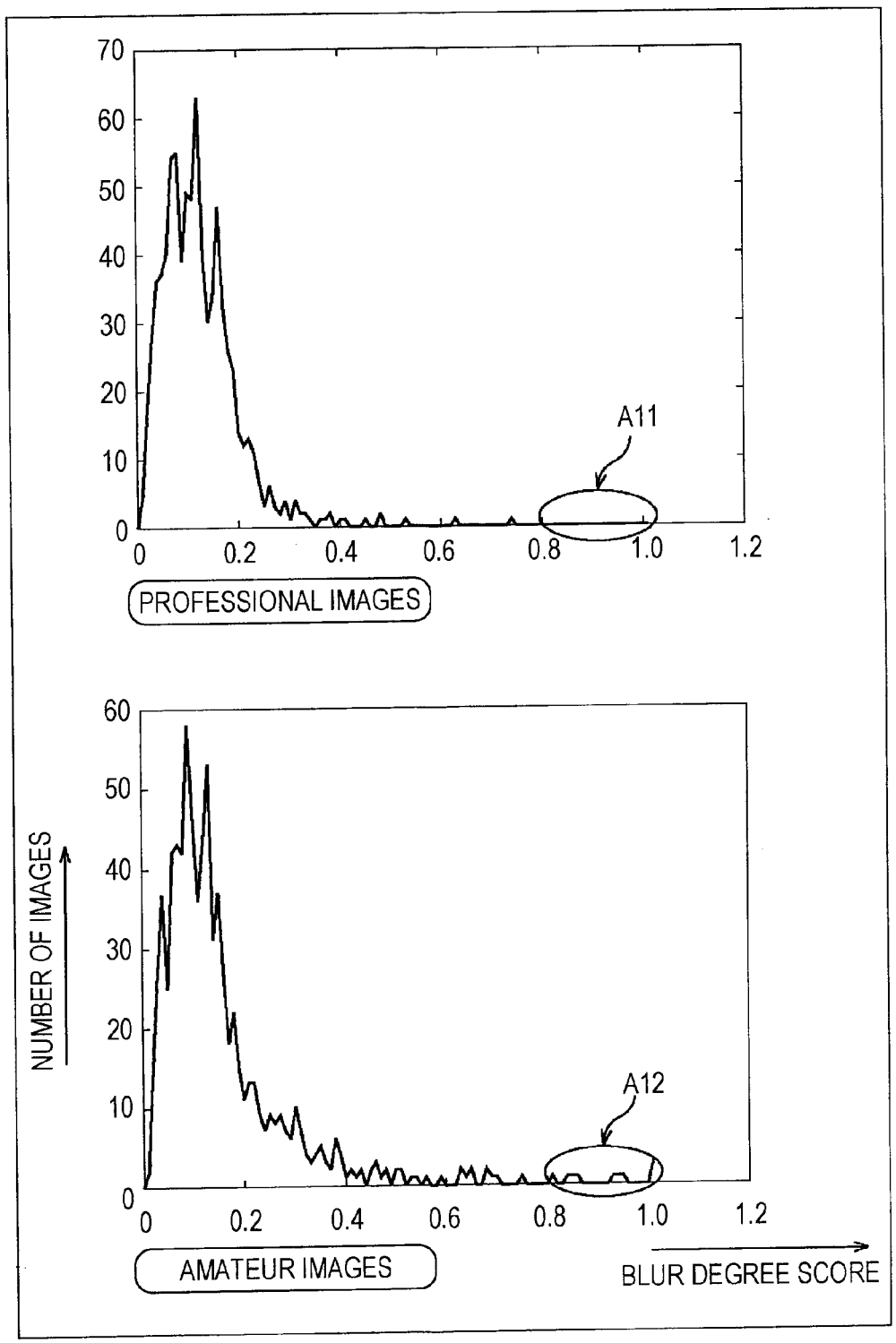
FIG. 14 illustrates a way of determining a score point with respect to a blur degree score.

For example, it is assumed that blur degree scores are obtained with regard to a plurality of professional images and amateur images, and the results shown in FIG. 14 are obtained. Meanwhile, in the figure, the vertical axis indicates the number of sample professional images or amateur images, and the horizontal axis indicates the value of the blur degree score.

In FIG. 14, the upper side of the figure indicates the distribution of the blur degree scores of the professional images, and the lower side in the figure indicates the distribution of the blur degree scores of the amateur images.

Most samples of the blur degree scores of the professional images are less than 0.3, and there are no samples whose blur degree score is greater than or equal to 0.8. That is, the smaller the degree of blur of the image, the smaller the blur degree score. Consequently, there are hardly any blurred images among the professional images.

In comparison, regarding most samples of the amateur images, blur degree scores thereof are less than 0.4. However, there are some amateur images whose blur degree score is greater than or equal to 0.4. That is, amateur images include some images that are entirely blurred.

When the blur degree scores of professional images are compared with the blur degree scores of amateur images, there are no professional images that exist in the range indicated by an arrow A11 in the distribution of the professional images, that is, images whose blur degree score is greater than or equal to 0.8. In comparison, there are several amateur images that exist in the range indicated by an arrow A12 in the distribution of the amateur images, that is, images whose blur degree score is greater than or equal to 0.8.

Therefore, when the blur degree score obtained for the input image is greater than or equal to 0.8, the input image has a high probability of being an amateur image, that is, an image that was poorly captured. Furthermore, the total value of score points regarding each feature-by-feature score is made to be an overall score, and the overall score indicates that the smaller it is, the better the image-capture state is.

Accordingly, when the blur degree score is greater than or equal to 0.8, that is, when the probability that the input image is an amateur image is high, the score point for the blur degree score is set to a large value so that the overall score will become large. Furthermore, in general, the smaller the degree of blur of the image, the higher the state in which the image has been satisfactorily captured. Consequently, the score point for the blur degree score is set to a small value.

Similarly, regarding another feature-by-feature score, by comparing the feature-by-feature score of the professional image that is prepared in advance with the feature-by-feature score of the amateur image, the score point for the range of the value of each feature-by-feature score is determined, and a conversion table for each feature-by-feature score is obtained in advance.

At this time, with respect to the range of the value in which the difference of the distribution of the feature-by-feature score between a professional image and an amateur image is marked, by determining a greater score point or a smaller score point according to the difference, it is possible to more appropriately (accurately) evaluate the image-capture state of the input image. That is, the accuracy of the evaluation can be improved.

Furthermore, even with the use of one feature score, it is difficult to appropriately evaluate the image-capture state of the input image. However, since the overall score is obtained from a plurality of feature-by-feature scores, it is possible to more appropriately evaluate the image-capture state of the input image.

For example, in the example of FIG. 14, there are many professional images and amateur images having a blur degree score of less than 0.2. For this reason, when the blur degree score of the input image is less than 0.2, it is difficult to accurately evaluate as to whether the input image is close to a professional image or close to an amateur image on the basis of only the blur degree score.

However, in each feature score, the range of the value exists at which as to whether the input image is close to a professional image or an amateur image can be more accurately identified. Therefore, if the score point is determined with respect to the range of the value of each feature-by-feature score and the score point for each feature-by-feature score is totaled so as to be set as an overall score, it is possible to more appropriately evaluate the image-capture state of the input image.

As described above, a case in which each feature-by-feature score is converted into a score point by using a conversion table and the sum total of those score points is obtained corresponds to one in which each feature-by-feature score is subjected to weighted addition so as to obtain an overall score.

Figure 12:
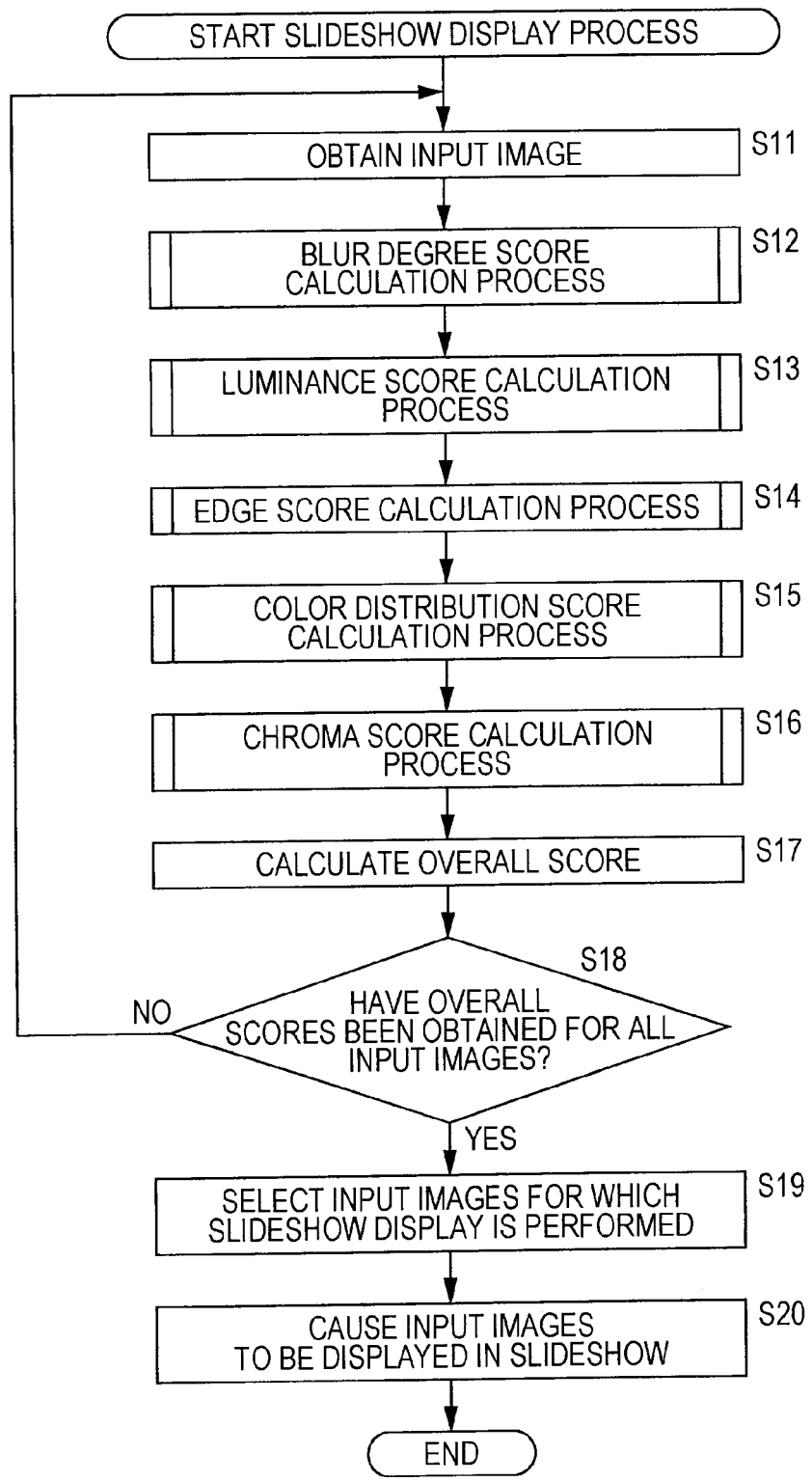
FIG. 12 is a flowchart illustrating a slideshow display process.

Referring back to the description of the flowchart of FIG. 12, when the overall score is obtained, the overall score calculation unit 28 supplies the obtained overall score to the display control unit 29. Then, the process proceeds from step S17 to step S18.

In step S18, the image processing apparatus 11 determines whether or not the overall score has been obtained with regard to all the input images. For example, in a case where the overall score of all the input images for which a slideshow display is performed, which is specified by the user, is obtained, it is determined that the overall score has been obtained with regard to all the input images.

When it is determined in step S18 that the overall score has not been obtained with regard to all the input images, the process returns to step S11, and the above-mentioned processing is repeated. That is, the obtaining unit 22 obtains the next input image and obtains the overall score with regard to the input image.

In contrast, when it is determined in step S18 that the overall score has been obtained with regard to all the input images, in step S19, the display control unit 29 selects the input images for which a slideshow display is performed.

For example, on the basis of the overall score of each input image supplied from the overall score calculation unit 28, the display control unit 29 selects, as input images to be displayed, those input images for which the overall score is smaller than or equal to a predetermined threshold value among the input images supplied from the obtaining unit 22. Meanwhile, the lower the value of the overall score, the higher the evaluation of the image-capture state of the input image indicates.

As described above, if the input images whose overall score is smaller than or equal to the threshold value are selected, only the input images for which evaluation of the image-capture state is high to a certain degree, that is, only the input images close to professional images to a certain degree can be displayed for a slideshow. Meanwhile, the input images to be displayed may be selected, for example, in a number correspond to a pre-specified number in ascending order of the overall score.

In step S20, the display control unit 29 causes the input images selected in step S19 to be sequentially supplied to the display unit 30, where the input images are displayed, thereby performing a slideshow display of the input images. Then, when the input images are displayed for the slideshow, the slideshow display process is completed. In the manner described above, when the selected input images are displayed for a slideshow, it is possible for the user to appreciate only the input images having a high evaluation.

As described above, the image processing apparatus 11 obtains a feature-by-feature score for each input image, and calculates an overall score on the basis of those feature-by-feature scores. As described above, by calculating an overall score on the basis of a plurality of feature-by-feature scores, it is possible to more appropriately evaluate the image-capture state of the input image.

[Description of Blur Degree Calculation Process]

Figure 15:
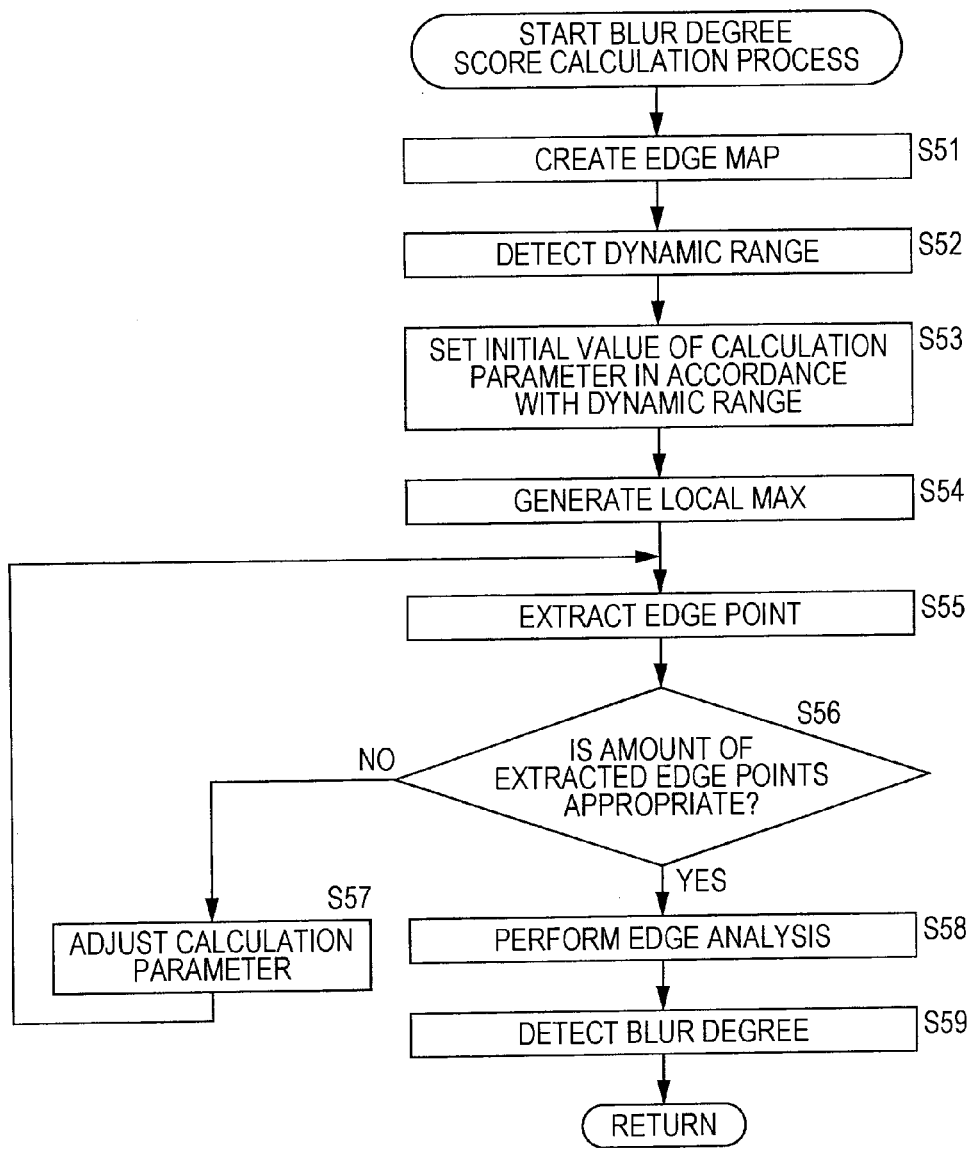
FIG. 15 is a flowchart illustrating a blur degree calculation process.

Next, a description will be given, with reference to the flowchart of FIG. 15, of a blur degree calculation process corresponding to the process of step S12 of FIG. 12.

In step S51, the edge map creation unit 61 creates an edge map by using the input image supplied from the obtaining unit 22.

Specifically, the edge map creation unit 61 divides the input image into blocks of the size of 2×2 pixels, and calculates an absolute value $M_{TL-TR}$ through to an absolute value $M_{BL-BR}$ of the difference of the pixel values between the pixels within each block in accordance with the following expressions (1) to (6).

[Math. 1]

$$M_{TL-TR} = |a-b| \quad (1)$$

$$M_{TL-BL} = |a-c| \quad (2)$$

$$M_{TL-BR} = |a-d| \quad (3)$$

$$M_{TR-BL} = |b-c| \quad (4)$$

$$M_{TR-BR} = |b-d| \quad (5)$$

$$M_{BL-BR} = |c-d| \quad (6)$$

Figure 16:
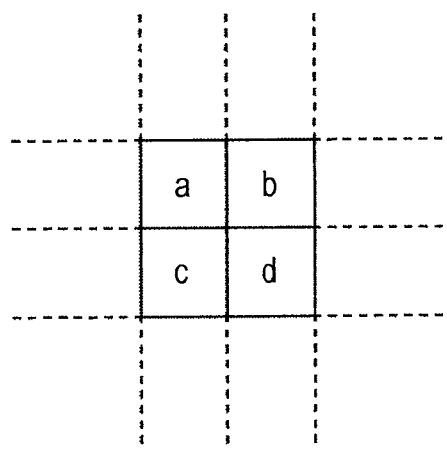
FIG. 16 illustrates the creation of an edge map.

Meanwhile, in Expressions (1) to (6), a, b, c, and d each denote the pixel value of the pixel within the block of the size of 2×2 pixels of the input image. For example, as shown in FIG. 16, the pixel value indicates the pixel value of the pixel in the left upper area in the figure of the block. Furthermore, the pixel value b indicates the pixel value of the pixel in the upper right area of the block in the figure. The pixel value c indicates the pixel value of the pixel in the lower left area of the block. The pixel value d indicates the pixel value of the pixel in the lower right area of the block.

Therefore, each of the absolute value $M_{TL-TR}$ through to the absolute value $M_{BL-BR}$ indicates the absolute value of the difference of the pixel values between adjacent pixels in each direction in the block, that is, the edge strength in each direction.

Next, the edge map creation unit 61 calculates the average value $M_{Ave}$ of the absolute value $M_{TL-TR}$ through to the absolute value $M_{BL-BR}$ in accordance with the following Expression (7). This average value $M_{Ave}$ indicates the average value of the edge strengths above, below, to the right, to the left, and oblique to the block.

[Math. 2]

$$M_{Ave} = \frac{M_{TL-TR} + M_{TL-BL} + M_{TL-BR} + M_{TR-BL} + M_{TR-BR} + M_{BL-BR}}{6} \quad (7)$$

The edge map creation unit 61 arranges the calculated average value $M_{Ave}$ of each block in the same order as that of the corresponding block of the input image so as to create an edge map of a scale SC1.

In addition, in order to create edge maps of a scale SC2 and a scale SC3, the edge map creation unit 61 generates averaged images of the scale SC2 and the scale SC3 in accordance with the following Expression (8).

[Math. 3]

$$P^{i+1}_{(m,n)} = \frac{P^{i}_{(2m,2n)} + P^{i}_{(2m,2n+1)} + P^{i}_{(2m+1,2n)} + P^{i}_{(2m+1,2n+1)}}{4} \quad (8)$$

Meanwhile, in Expression (8), $P^{i}(x, y)$ indicates the pixel value of the pixel positioned in the coordinate (x, y) in the averaged image of a scale SCi (where i=1, 2). Furthermore, $P^{i+1}(x, y)$ indicates the pixel value of the pixel positioned in the coordinate (x, y) in the averaged image of the scale SCi+1. Meanwhile, the averaged image of the scale SC1 is assumed to be an input image.

Therefore, the averaged image of the scale SC2 is an image in which the average value of the pixel values of the pixels in each block in which the input image is divided into blocks of the size of 2×2 pixels is set as the pixel value of one pixel. Furthermore, the averaged image of the scale SC3 is an image in which the average value of the pixel values of the pixels within each block such that the averaged image of the scale SC2 is divided into blocks of the size of 2×2 pixels is set as the pixel value of one pixel.

The edge map creation unit 61 performs the same process as that performed on the input image by using the Expressions (1) to (7) on the averaged images of the scale SC2 and the scale SC3 so as to create edge maps of the scale SC2 and the scale SC3.

Therefore, the edge maps of the scale SC1 through to the scale SC3 are images obtained by extracting the edge components of the mutually different frequency bands from the input image. Meanwhile, the number of pixels of the edge map of the scale SC1 is ¼ (vertical ½×horizontal ½) of the input image, the number of pixels of the edge map of the scale SC2 is 1/16 (vertical ¼×horizontal ¼) of the input image, and the number of pixels of the edge map of the scale SC3 is 1/64 (vertical ⅛×horizontal ⅛) of the input image.

The edge map creation unit 61 supplies the created edge maps of the scale SC1 through to the scale SC3 to the dynamic-range detection unit 62 and the local max generation unit 64. As described above, by creating edge maps of different scales in units of blocks of different sizes, it is possible to suppress variations in edge strengths.

In step S52, by using the edge map supplied from the edge map creation unit 61, the dynamic-range detection unit 62 detects the dynamic range of the input image and supplies the detection result to the calculation parameter adjustment unit 63.

Specifically, the dynamic-range detection unit 62 detects the maximum value and the minimum value of the pixel values from among the edge maps of the scale SC1 through to the scale SC3, and sets the value obtained by subtracting the minimum value from the detected maximum value of the pixel value as the dynamic range of the edge strength of the input image. That is, the difference between the maximum value and the minimum value of the edge strengths of the input image is detected as the dynamic range.

Meanwhile, in addition to the above-mentioned method, for example, it is considered that the dynamic range is detected for each edge map, and the maximum value and the average value of the detected dynamic range is adopted as a dynamic range used in practice.

In step S53, the calculation parameter adjustment unit 63 sets the initial value of the calculation parameter on the basis of the dynamic ranges supplied from the dynamic-range detection unit 62.

That is, when the dynamic range is less than the predetermined threshold value, the calculation parameter adjustment unit 63 sets the input image as the image of the low dynamic range, and when the dynamic range is greater than or equal to the threshold value, the calculation parameter adjustment unit 63 sets the input image as the image of the high dynamic range.

Then, when the input image is the image of the low dynamic range, the calculation parameter adjustment unit 63 sets the initial value for the image of the low dynamic range in the calculation parameter. Furthermore, when the input image is the image of the high dynamic range, the calculation parameter adjustment unit 63 sets the initial value for the image of the high dynamic range in the calculation parameter.

Here, it is estimated that the image of the low dynamic range has smaller edges when compared to the image of the high dynamic range, and the amount of edge points extracted is small. Therefore, in order that edge points of an amount sufficient to make the detection accuracy of the degree of blur of the input image to be a fixed level or higher, the initial value of the edge reference value for the image of the low dynamic range is set to be a value smaller than the initial value of the edge reference value for the image of the high dynamic range. Furthermore, the initial value of the extraction reference value for the image of the low dynamic range is set to be a value smaller than the initial value of the extraction reference value for the image of the high dynamic range.

The calculation parameter adjustment unit 63 supplies the edge reference value that is set on the basis of the dynamic range to the edge point extraction unit 65, and supplies the edge reference value and the extraction reference value to the extraction amount determination unit 66.

In step S54, the local max generation unit 64 generates a local max by using the edge map supplied from the edge map creation unit 61, and supplies the local max to the edge point extraction unit 65 and the edge analysis unit 67.

Figure 17:
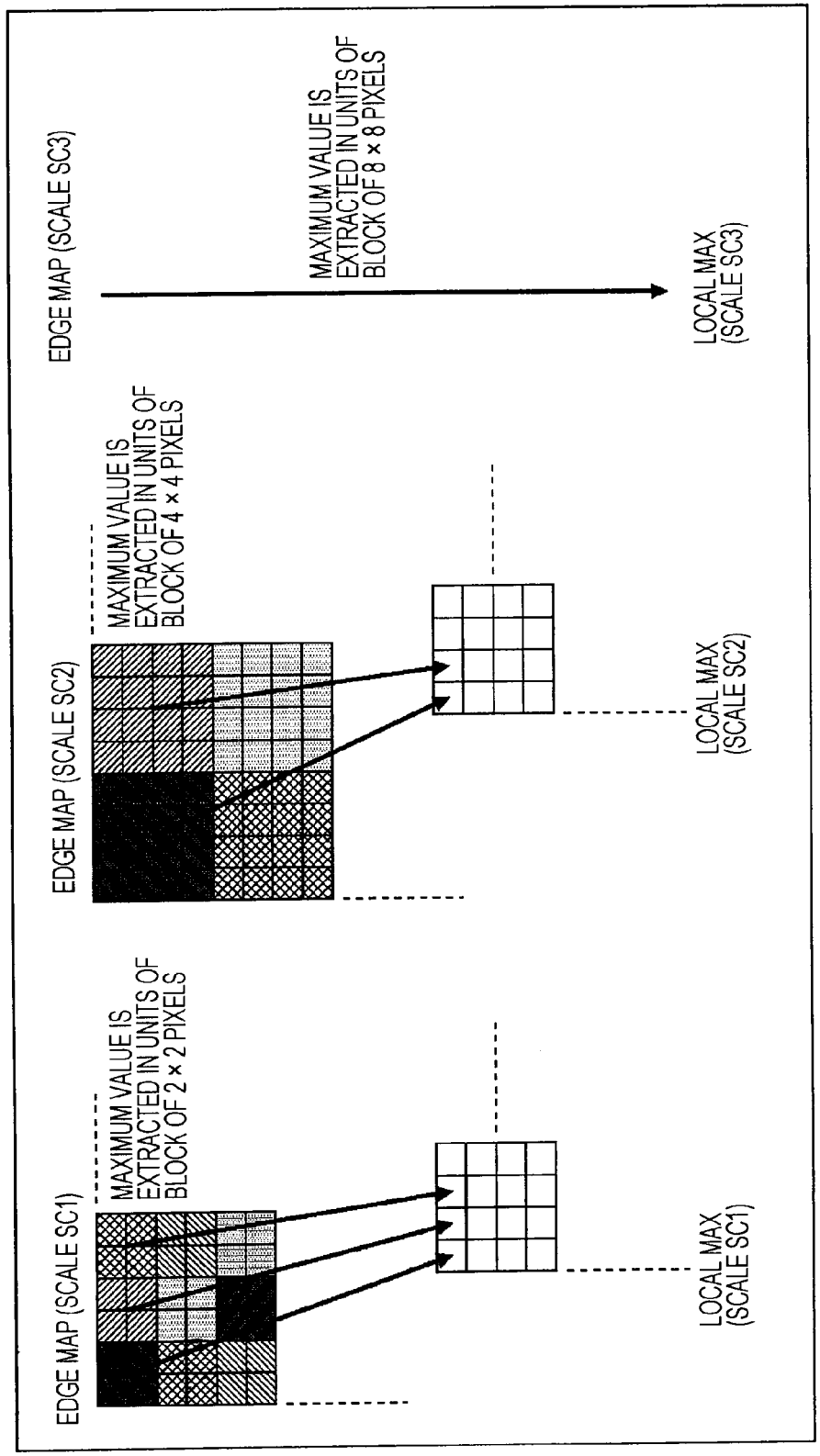
FIG. 17 illustrates the creation of a local max.

For example, as shown in the left side of FIG. 17, the local max generation unit 64 divides the edge map of the scale SC1 into blocks of 2×2 pixels. Then, the local max generation unit 64 extracts the maximum value of each block of the edge map, and arranges the extracted maximum value in the same order as that of the corresponding block, thereby generating a local max LM1 of the scale SC1. That is, the maximum value of the pixel values of the pixels in each block is extracted.

Furthermore, as shown in the center in the figure, the local max generation unit 64 divides the edge map of the scale SC2 into blocks of 4×4 pixels. Then, the local max generation unit 64 extracts the maximum value of each block of the edge map, and arranges the extracted maximum value in the same order as that of the corresponding blocks, generating a local max LM2 of the scale SC2.

In addition, as shown in the right side in the figure, the local max generation unit 64 divides the edge map of the scale SC3 into blocks of 8×8 pixels. Then, the local max generation unit 64 extracts the maximum value of each block of the edge map, and arranges the extracted maximum value in the same order as that of the corresponding block, thereby generating a local max LM3 of the scale SC3.

In step S55, the edge point extraction unit 65 extracts edge points from the input image by using the edge reference value from the calculation parameter adjustment unit 63 and the local max supplied from the local max generation unit 64.

Specifically, the edge point extraction unit 65 selects one of the pixels of the input image and sets it as a pixel of interest. Furthermore, the edge point extraction unit 65 sets the coordinate of the xy coordinate system in the input image of the coordinate (x1, y1) of selected pixel of interest as (x, y), and obtains the pixel of the local max LM1 corresponding to the pixel of interest in accordance with the following Expression (9).

$$(x1, y1) = (x/4, y/4) \tag{9}$$

Meanwhile, in Expression (9), all digits to the right of the decimal point of the values of x/4 and y/4 are assumed to be discarded.

One pixel of the local max LM1 is generated from a block of 4×4 pixels of the input image. Consequently, the coordinates of the pixel of the local max LM1, which corresponds to the pixel of interest of the input image, are values in which the x coordinate and the y coordinate of the pixel of interest are correspondingly made to be ¼.

Similarly, in accordance with the following Expressions (10) and (11), the edge point extraction unit 65 obtains the coordinate (x2, y2) of the pixel of the local max LM2 corresponding to the pixel of interest, and the coordinate (x3, y3) of the pixel of the local max LM3 corresponding to the pixel of interest.

$$(x2, y2) = (x/16, y/16) \tag{10}$$

$$(x3, y3) = (x/64, y/64) \tag{11}$$

Meanwhile, in Expression (10) and Expression (11), all digits to the right of the decimal point of the values of x/16, y/16, x/64, and y/64 are discarded.

In addition, in the case where the pixel value of the pixel of the coordinate (x1, y1) of the local max LM1 is greater than or equal to the edge reference value, the edge point extraction unit 65 extracts the pixel of interest as an edge point in the local max LM1. Then, the edge point extraction unit 65 stores the pixel values at the coordinate (x, y) of the pixel of interest and the coordinate (x1, y1) of the local max LM1 in such a manner as to be associated with each other.

Similarly, in the case where the pixel value of the pixel at the coordinate (x2, y2) of the local max LM2 is greater than or equal to the edge reference value, the edge point extraction unit 65 extracts the pixel of interest as the edge point in the local max LM2, and stores the pixel values at the coordinate (x, y) of the pixel of interest and the coordinate (x2, y2) of the local max LM2 in such a manner as to be associated with each other. Furthermore, in the case where the pixel value of the pixel of the coordinate (x3, y3) of the local max LM3 is greater than or equal to the edge reference value, the edge point extraction unit 65 extracts the pixel of interest as the edge point in the local max LM3, and stores the pixel values at the coordinate (x, y) of the pixel of interest and at the coordinate (x3, y3) of the local max LM3 in such a manner as to be associated with each other.

The edge point extraction unit 65 repeats the above processes until all the pixels of the input image are set as a pixel of interest.

As a result, on the basis of the local max LM1, pixels contained in the block in which the edge strength is greater than or equal to the edge reference value among the blocks of 4×4 pixels in the input image are extracted as edge points.

Similarly, on the basis of the local max LM2, pixels contained in the block in which the edge strength is greater than or equal to the edge reference value in the block from among the blocks of 16×16 pixels in the input image are extracted as edge points. Furthermore, on the basis of the local max LM3, pixels contained in the block in which the edge strength in the block is greater than or equal to the edge reference value among the blocks of 64×64 pixels of the input image are extracted as edge points.

Therefore, pixels contained in at least one of the blocks of 4×4 pixels, 16×16 pixels, and 64×64 pixels of the input image, in which the edge strength is greater than or equal to the edge reference value, are extracted as edge points.

The edge point extraction unit 65 generates an edge point table ET1, which is a table in which the coordinate (x, y) of the edge point extracted on the basis of the local max LM1 and the pixel value of the pixel of the local max LM1 corresponding to the edge point are associated with each other.

Similarly, the edge point extraction unit 65 generates an edge point table ET2 in which the coordinate (x, y) of the edge point extracted on the basis of the local max LM2 and the pixel value of the pixel of the local max LM2 corresponding to the edge point are associated with each other. Furthermore, the edge point extraction unit 65 also generates an edge point table ET3 in which the coordinate (x, y) of the edge point extracted on the basis of the local max LM3 and the pixel value of the pixel of the local max LM3 corresponding to the edge point are associated with each other.

Then, the edge point extraction unit 65 supplies those generated edge point tables to the extraction amount determination unit 66.

In step S56, the extraction amount determination unit 66 determines whether or not the edge point extraction amount is appropriate by using the edge point table supplied from the edge point extraction unit 65. For example, when the total number of the extracted edge points, that is, the total of the numbers of items of data of the edge point table ET1 through to the edge point table ET3, is less than the extraction reference value supplied from the calculation parameter adjustment unit 63, the extraction amount determination unit 66 determines that the edge point extraction amount is not appropriate.

When it is determined in step S56 that the edge point extraction amount is not appropriate, the extraction amount determination unit 66 notifies the calculation parameter adjustment unit 63 of the fact that the edge point extraction amount is not appropriate, and the process then proceeds to step S57.

In step S57, the calculation parameter adjustment unit 63 adjusts the calculation parameter on the basis of the notification from the extraction amount determination unit 66.

For example, the calculation parameter adjustment unit 63 decreases the edge reference value by an amount corresponding to a predetermined value from the value that is set at the current moment so that many more edge points are extracted than at the current moment. The calculation parameter adjustment unit 63 supplies the adjusted edge reference value to the edge point extraction unit 65 and the extraction amount determination unit 66.

When the calculation parameter is adjusted, thereafter, the process returns to step S55, and the above-mentioned processing is repeated until it is determined that the edge point extraction amount is appropriate.

Furthermore, when it is determined in step S56 that the edge point extraction amount is appropriate, the extraction amount determination unit 66 supplies the edge reference value from the calculation parameter adjustment unit 63 and the edge point table to the edge analysis unit 67. The process then proceeds to step S58.

As a result of the above processing, in order to improve the accuracy of detecting the degree of blur, with regard to the input image of the low dynamic range, an edge point is extracted also from a block in which the edge strength is weak so that edge points in an amount sufficient to make the accuracy of detecting the degree of blur to be a fixed level or higher can be secured. On the other hand, with regard to the input image of a high dynamic range, edge points are extracted from a block in which an edge strength is as strong as possible so that edge points forming a stronger edge are extracted.

In step S58, the edge analysis unit 67 performs edge analysis by using the edge reference value and the edge point table supplied from the extraction amount determination unit 66, and the local max supplied from the local max generation unit 64.

Specifically, on the basis of the edge point table ET1 through to the edge point table ET3, the edge analysis unit 67 sets one of the edge points extracted from the input image as a pixel of interest. Then, the edge analysis unit 67 sets the coordinate of the xy coordinate system of the pixel of interest as (x, y), and obtains the coordinate (x1, y1) through to the coordinate (x3, y3) of the local max LM1 through to the local max LM3 corresponding to the pixel of interest in accordance with the above-mentioned Expressions (9) to (11).

The edge analysis unit 67 sets, as Local Max1(x1, y1), the maximum value of the pixel values of the pixels in the block of the local max LM1 of m×m pixels (for example, 4×4 pixels) in which the pixel of the coordinate (x1, y1) of the local max LM1 is the pixel in the left upper corner. Furthermore, the edge analysis unit 67 sets, as Local Max2(x2, y2), the maximum value of the pixel value in the block of n×n pixel (for example, 2×2 pixels) in which the pixel of the coordinate (x2, y2) of the local max LM2 is the pixel at the left upper corner, and sets the pixel value of the coordinate (x3, y3) of the local max LM3 as Local Max3(x3, y3).

Meanwhile, parameters for m×m used for setting Local Max1(x1, y1) and for n×n used for setting Local Max2(x2, y2) are parameters for adjusting the difference in the sizes of the blocks of the input images corresponding to one pixel of the local max LM1 through to the local max LM3.

The edge analysis unit 67 determines whether or not Local Max1(x1, y1), Local Max2(x2, y2), and Local Max3(x3, y3) satisfy the following condition expression (12). When Local Max1(x1, y1), Local Max2(x2, y2), and Local Max3(x3, y3) satisfy the condition expression (12), the edge analysis unit 67 increments the value of the variable Nedge by one.

[Math. 4]

$$\text{Local max1}(x1, y1) > \text{Edge reference value}$$

or $$\text{Local max2}(x2, y2) > \text{Edge reference value}$$

or $$\text{Local max3}(x3, y3) > \text{Edge reference value} \quad (12)$$

Figure 18:
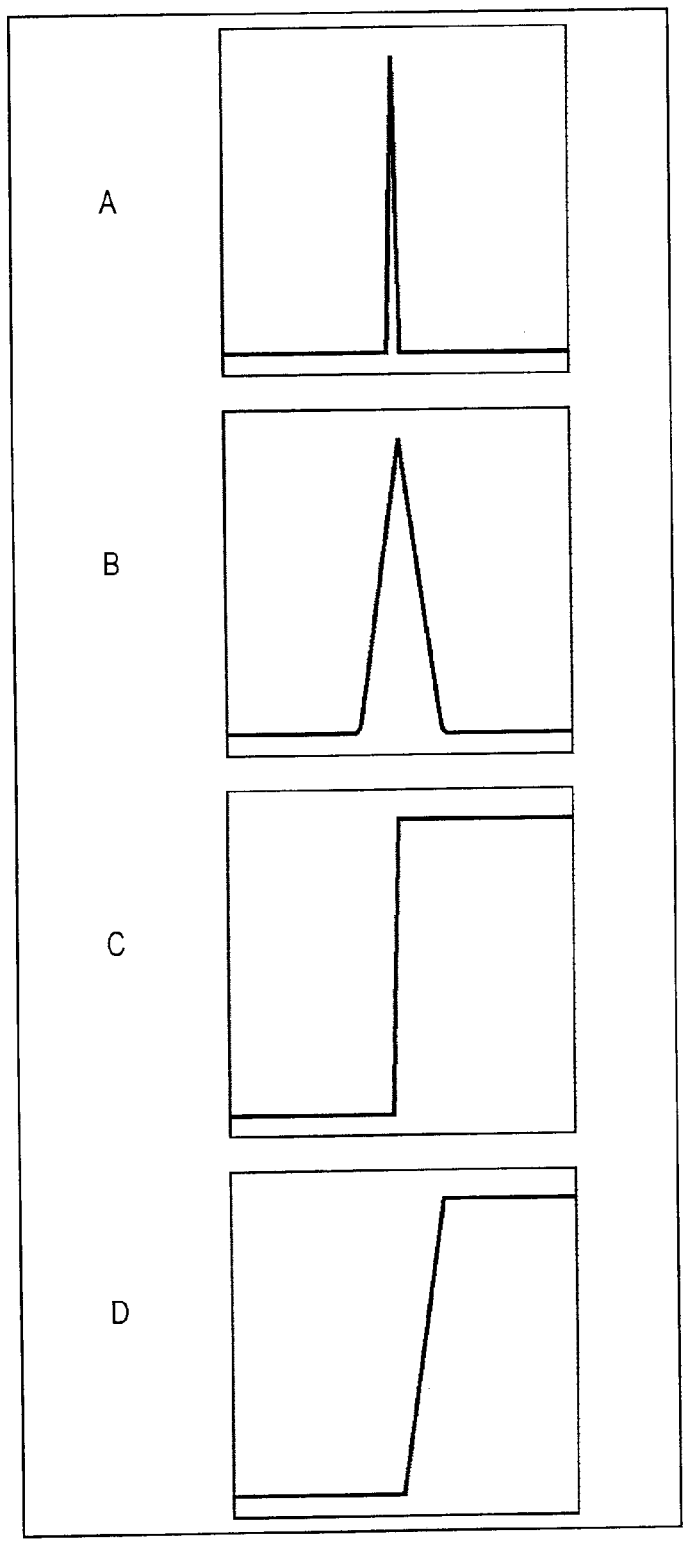
FIG. 18 illustrates an example of an edge.

Meanwhile, it is estimated that an edge point that satisfies the condition expression (12) is an edge point forming an edge having a fixed strength or higher regardless of the structure thereof, such as an edge indicated at A of FIG. 18 to D of FIG. 18.

Here, the edge indicated at A of FIG. 18 is formed to be an edge in a sharp impulse shape, the edge indicated at B of FIG. 18 is formed to be an edge in a pulse shape having an inclination more moderate than that of the edge of A of FIG. 18, and the edge indicated at C of FIG. 18 is an edge in a step-like shape whose inclination is substantially perpendicular. Furthermore, the edge indicated at C of FIG. 18 is an edge in a step-like shape whose inclination is more moderate than that of the edge indicated at C of FIG. 18.

When Local Max1(x1, y1), Local Max2(x2, y2), and Local Max3(x3, y3) satisfy the condition expression (12), the edge analysis unit 67 further determines whether or not the following condition expression (13) or (14) is satisfied. When Local Max1(x1, y1), Local Max2(x2, y2), and Local Max3(x3, y3) satisfy the condition expression (13) or the condition expression (14), the edge analysis unit 67 increments the value of the variable Nsmallblur by one.

[Math. 5]

$$\text{Local max1}(x1,y1) < \text{Local max2}(x2,y2) < \text{Local max3}(x3,y3) \tag{13}$$

$$\text{Local max2}(x2,y2) > \text{Local max1}(x1,y1)$$

and $$\text{Local max2}(x2,y2) > \text{Local max1}(x3,y3) \tag{14}$$

Meanwhile, it is estimated that the edge point that satisfies the condition expression (12) and that satisfies the condition expression (13) or the condition expression (14) is an edge point forming an edge, which has the structure of B of FIG. 18 or D of FIG. 18 having a fixed or higher strength but having a strength weaker than that of the edge of A of FIG. 18 or C of FIG. 18.

In addition, when Local Max1(x1, y1), Local Max2(x2, y2), and Local Max3(x3, y3) satisfy the condition expression (12) and satisfy the condition expression (13) or the condition expression (14), the edge analysis unit 67 determines whether or not Local Max1(x1, y1) satisfies the following condition expression (15). When Local Max1(x1, y1) satisfies the condition expression (15), the edge analysis unit 67 increments the value of the variable Nlargeblur by one.

[Math. 6]

$$\text{Local max1}(x1,y1) < \text{Edge reference value} \tag{15}$$

Meanwhile, it is estimated that the edge point that satisfies the condition expression (12), that satisfies the condition expression (13) or the condition expression (14), and that satisfies the condition expression (15) is an edge point forming an edge in which a blur has occurred and clearness is lost within the edge having the structure of B of FIG. 18 or D of FIG. 18, the edge having a fixed strength or higher. In other words, it is estimated that blur has occurred at the edge point.

The edge analysis unit 67 repeats the above processing until all the edge points extracted from the input image are used as a pixel of interest. As a result, among the extracted edge points, the number Nedge of edge points, the number Nsmallblur of edge points, and the number Nlargeblur of edge points are obtained.

Here, the number Nedge is the number of edge points that satisfy the condition expression (12), the number Nsmallblur is the number of edge points that satisfy the condition expression (12), and that satisfy the condition expression (13) or the condition expression (14). Furthermore, the number Nlargeblur is the number of edge points that satisfy the condition expression (12) and that satisfy the condition expression (13) or the condition expression (14), and that satisfy the condition expression (15).

The edge analysis unit 67 supplies the calculated number Nsmallblur and number Nlargeblur to the blur degree detection unit 68.

In step S59, the blur degree detection unit 68 calculates the following expression (16) by using the number Nsmallblur and the number Nlargeblur from the edge analysis unit 67, and obtains, as a blur degree score, a degree of blur BlurEstimation serving as an index of the degree of blur of the input image.

[Math. 7]

$$BlurEstimation = \frac{N_{largeblur}}{N_{smallblur}} \tag{16}$$

That is, the degree of blur BlurEstimation is a proportion at which edge points that are estimated to form an edge at which blur has occurred among the edge points estimated to form an edge having B of FIG. 18 or D of FIG. 18 of a fixed strength or higher. Therefore, the greater the degree of blur BlurEstimation, the larger the degree of blur of the input image is estimated to be.

When the blur degree detection unit 68 obtains the blur degree score, the blur degree detection unit 68 supplies the obtained blur degree score to the overall score calculation unit 28, and the blur degree calculation process is completed. The process then proceeds to step S13 of FIG. 12.

In the manner described above, the blur degree score calculation unit 23 calculates the blur degree score indicating the degree of blur of the entire input image from the input image. When the blur degree score is to be calculated, since conditions for extracting an edge point and the amount of extraction of the edge point are appropriately controlled in accordance with the input image, it is possible to detect the degree of blur of the input image with a higher accuracy.

Meanwhile, in the foregoing, a description has been given in such a manner that the blur of the entire input image is obtained as a blur degree score. However, the degree of blur of the subject portion may be obtained as a blur degree score by targeting only the subject portion in the input image.

[Description of Luminance Score Calculation Process]

Figure 19:
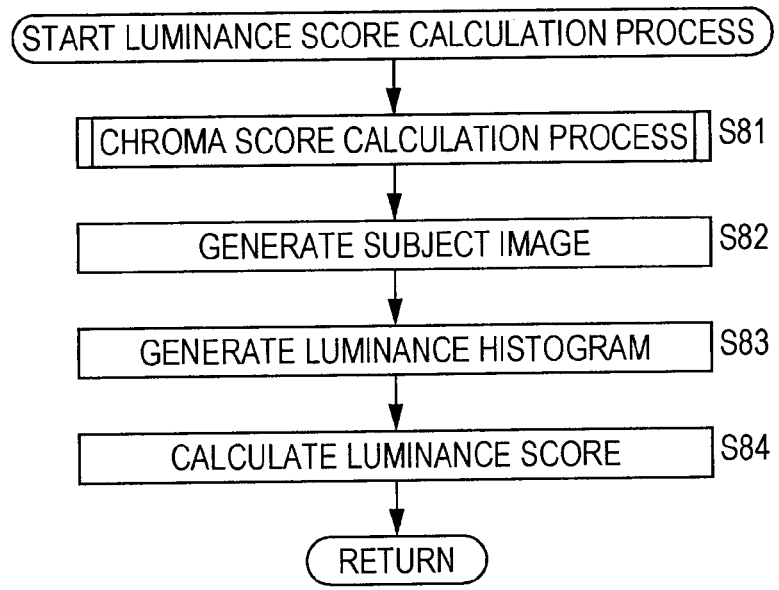
FIG. 19 is a flowchart illustrating a luminance score calculation process.

Next, a description will be given, with reference to the flowchart of FIG. 19, of a luminance score calculation process corresponding to the process of step S13 of FIG. 12.

In step S81, the subject extraction unit 91 performs a subject map creation process so as to create a subject map from the input image supplied from the obtaining unit 22, and supplies the subject map to the multiplication unit 92. Meanwhile, the details of the subject map creation process will be described later.

In step S82, the multiplication unit 92 multiplies the input image supplied from the obtaining unit 22 by the subject map supplied from the subject extraction unit 91 so as to generate a subject image, and supplies the subject image to the histogram generation unit 93. That is, when the pixel to which notice is paid of the subject image is made to be a pixel of interest, the product of the pixel value of the pixel of the subject map and the pixel value of the pixel of the input image at the same position as that of the pixel of interest is made to be the pixel value of the pixel of interest. This subject image is an image such that only the subject portion in the input image is displayed.

In step S83, on the basis of the subject image supplied from the multiplication unit 92, the histogram generation unit 93 generates a luminance histogram in which the range of the luminance value of the pixel of the subject image is a bin, and supplies the luminance histogram to the normalization unit 94. Furthermore, the normalization unit 94 normalizes the histogram from the histogram generation unit 93, and supplies the histogram to the score calculation unit 95.

In step S84, on the basis of the histogram supplied from the normalization unit 94, the score calculation unit 95 calculates a luminance score in accordance with a K-NN (K-Nearest Neighbor) method or the like, and supplies the luminance score to the overall score calculation unit 28.

For example, with regard to the professional image and the amateur image that have been prepared in advance, the score calculation unit 95 holds a plurality of luminance histograms, which have been generated by the processes identical to the processes of steps S81 to S83. The score calculation unit 95 calculates the distance between each of the histograms of the plurality of professional images and amateur images that are held in advance, and the histogram from the normalization unit 94.

That is, the score calculation unit 95 sets the total value of the differences of the frequent value of each bin between the luminance histogram of the input image and one histogram that is held in advance as the distance between those histograms. That is, the difference of the frequent values between the bins of the same representative value is obtained, and the sum total of the differences obtained for each bin is set as the distance between the histograms.

Then, the score calculation unit 95 selects K distances in the ascending order of the value of the distance from among the distances between the histogram of the subject image and the histogram that is held in advance.

In addition, the score calculation unit 95 subtracts the number of distances of the histograms of the subject image and the amateur image from the number of distances of histograms of the subject image and the professional image from among the selected K distances, and sets the thus obtained value as a luminance score.

Here, the distance between the histogram of the subject image and the histogram of the professional image or the amateur image is the sum total of the differences of the frequent values of each bin. Consequently, the more similar the distribution of the luminance of those images, the smaller the value of the distance. That is, the smaller the distance, the closer to the professional image or the amateur image for which processing is performed the subject image is.

Then, the difference between the number of distances to the histogram of the professional image and the number of distances to the histogram of the amateur image is set as the luminance score. Consequently, the greater the number of professional images having a distribution of luminance resembling to that of the subject image, the greater the value of the luminance score. That is, this luminance score indicates the degree of similarity of the luminance distribution of the subject image with respect to the professional image, and the greater the value of the luminance score of the input image, the higher the evaluation of the image-capture state of the image.

As described above, when the luminance score is calculated, the score calculation unit 95 supplies the calculated luminance score to the overall score calculation unit 28, and the luminance score calculation process is completed. Then, after that, the process proceeds to step S14 of FIG. 12.

In the manner described above, the luminance score calculation unit 24 extracts the area of the subject from the input image, compares the distribution of the luminance in the area of the subject with the luminance distribution in the area of the subject of the professional image and the amateur image so as to calculate a luminance score. As described above, the luminance distribution is compared by targeting only the area of the subject of the input image so as to calculate a luminance score, making it possible to more appropriately evaluate the image-capture state of the input image.

For example, in general, an image in which the luminance of the portion of the subject in the image is bright is regarded as an image having a high evaluation, which was satisfactorily captured, even if the background portion is dark. In this case, when the entire image is a target to be processed, and the image-capture state of the image is evaluated by using the luminance distribution as an index, if the luminance distribution of the background portion differs in spite of the fact that the luminance distribution of the portion of the subject is close to the luminance distribution of the subject portion of the professional image, the evaluation of the image is low.

As described above, in a case where the image-capture state of the image is to be evaluated by using the luminance distribution as an index, the luminance distribution of the area of the subject within the image is important, and the luminance distribution of the background portion is not necessarily needed for evaluation. That is, the evaluation of the input image is sufficiently possible from the luminance distribution of the subject portion. When the luminance distribution of the background portion is considered, conversely, there is a risk in that the evaluation method will become complex or an erroneous evaluation will be made.

Accordingly, in the luminance score calculation unit 24, by calculating a luminance score by targeting only the area of the subject of the input image as a processing target, it is possible to more simply and more appropriately evaluate the image-capture state of the input image.

[Description of Subject Map Creation Process]

In addition, a description will be given below, with reference to the flowchart of FIG. 20, of a subject map creation process corresponding to the process of step S81 of FIG. 19.

In step S11, the luminance information extraction unit 121 performs a luminance information extraction process so as to create a luminance information map on the basis of the input image supplied from the obtaining unit 22, and supplies the luminance information map to the subject map creation unit 125. Then, in step S112, the color information extraction unit 122 performs a color information extraction process so as to create a color information map on the basis of the input image supplied from the obtaining unit 22, and supplies the color information map to the subject map creation unit 125.

In step S113, the edge information extraction unit 123 performs an edge information extraction process so as to create an edge information map on the basis of the input image supplied from the obtaining unit 22, and supplies the edge information map to the subject map creation unit 125. Furthermore, in step S114, the face information extraction unit 124 performs a face information extraction process so as to create a face information map on the basis of the input image supplied from the obtaining unit 22, and supplies the face information map to the subject map creation unit 125.

Meanwhile, the details of the luminance information extraction process, the color information extraction process, the edge information extraction process, and the face information extraction process will be described later.

In step S115, the subject map creation unit 125 creates subject maps by using the luminance information map through to the face information map supplied from the luminance information extraction unit 121 through to the face information extraction unit 124, respectively, and supplies the subject maps to the multiplication unit 92 of FIG. 3.

For example, the subject map creation unit 125 linearly combines information maps by using an information weight Wb that is a weight that has been obtained in advance for each information map, and normalizes the information maps by multiplying the pixel value of the thus obtained map by a subject weight Wc that is a weight obtained in advance so as to form a subject map.

That is, if a pixel to which notice is paid in the subject map to be obtained is set as a pixel of interest, the pixel value of the pixel of each information map at the same position as that of the pixel of interest is multiplied by the information weight Wb for each information map, and the sum total of the pixel values by which the information weight Wb is multiplied is set as the pixel value of the pixel of interest. In addition, the pixel value of each pixel of the subject map obtained in this manner is multiplied by a subject weight Wc obtained in advance with respect to the subject map so as to be normalized, and is formed as a final subject map.

Meanwhile, in more detail, as color information maps, a color information map of difference of RG and a color information map of the difference of BY are used. As edge information maps, edge information maps in the direction of each of 0 degrees, 45 degrees, 90 degrees, and 135 degrees are used. Thus, a subject map is created. Furthermore, the subject weight Wc has been obtained in advance by learning, and the normalization causes the pixel value of each pixel of the subject map to take one of the values of 0 and 1. That is, in the normalization, a threshold process using a predetermined threshold value causes the pixel value of each pixel to be binarized.

When the subject map is created and supplied to the multiplication unit 92 in the manner described above, the subject map creation process is completed. After that, the process proceeds to step S82 of FIG. 19.

In the manner described above, the subject extraction unit 91 extracts each information from the area of the input image and creates a subject map.

[Description of Luminance Information Extraction Process]

Next, a description will be given, with reference to the flowcharts of FIGS. 21 to 24, of processes corresponding to corresponding processes of steps S111 to S114 of FIG. 20.

First, a description will be given below, with reference to the flowchart of FIG. 21, of a luminance information extraction process corresponding to the process of step S111 of FIG. 20.

In step S151, the luminance image generation unit 151 generates a luminance image by using the input image supplied from the obtaining unit 22, and supplies the luminance image to the pyramid image generation unit 152. For example, the luminance image generation unit 151 multiplies the value of each component of R, G, and B of the pixel of the input image by a pre-specified coefficient for each component, and sets the sum of the values of each component in which the coefficient is multiplied to be the pixel value of the pixel of the luminance image at the same position as that of the pixel of the input image. That is, the luminance components of a component signal composed of luminance components (Y) and color-difference components (Cb, Cr) are obtained. Meanwhile, the average value of the values of each component of R, G, and B of the pixel may be set as the pixel value of the pixel of the luminance image.

In step S152, on the basis of the luminance image supplied from the luminance image generation unit 151, the pyramid image generation unit 152 generates pyramid images of each hierarchy from the level L1 to level L8, and supplies the pyramid images to the difference calculation unit 153.

In step S153, the difference calculation unit 153 generates and normalizes a difference image by using the pyramid images supplied from the pyramid image generation unit 152, and supplies it to the luminance information map creation unit 154. The normalization is performed in such a manner that the pixel value of the pixel of the difference image becomes, for example, a value between 0 to 255.

Specifically, the difference calculation unit 153 obtains a difference between the pyramid images of a combination of the hierarchies of level L6 and level L3, level L7 and level L3, level L7 and level L4, level L8 and level L4, and level L8 and level L5 among the pyramid images of the luminance of each hierarchy. As a result, a total of five difference images of luminance are obtained.

For example, in a case where a difference image of the combinations of level L6 and level L3 is to be generated, the pyramid image of the level L6 is up-converted in accordance with the size of the pyramid image of the level L3. That is, the pixel value of one pixel of the pyramid image of the level L6 before up-conversion is set as the pixel value of several mutually adjacent pixels of the pyramid image of the level L6 after up-conversion, which corresponds to one pixel. Then, the difference between the pixel value of the pixel of the pyramid image of the level L6 and the pixel value of the pixel of the pyramid image of level L3 at the same position as that of the pixel of the pyramid image of the level L6 is obtained, and the difference is set as the pixel value of the pixel of the difference image.

The process for generating these difference images is equivalent to that in which a filtering process using a bandpass filter is performed on a luminance image, and predetermined frequency components are extracted from the luminance image. The pixel value of the pixel of the difference image, which is obtained in this manner, indicates a difference between the pixel values of the pyramid images of each level, that is, a difference between the luminance in the predetermined pixel in the input image and the average luminance in the surrounding area of the pixel.

In general, an area having a large difference in luminance with the surrounding area in the image is an area that attracts the attention of a person who views the image. Consequently, the area has a high probability of being the area of the subject. Therefore, it can be said that a pixel having a larger pixel value in each difference image is an area having a high probability of being the area of the subject.

In step S154, the luminance information map creation unit 154 creates a luminance information map on the basis of the difference images supplied from the difference calculation unit 153, and supplies the luminance information map to the subject map creation unit 125. When the luminance information map is supplied from the luminance information map creation unit 154 to the subject map creation unit 125, the luminance information extraction process is completed, and the process then proceeds to step S112 of FIG. 20.

For example, the luminance information map creation unit 154 performs weighted addition of the five supplied difference images by using the difference weight Wa that is a weight for each difference image so as to obtain one image. That is, each of the pixel values of the pixels at the same position as that of each difference image is multiplied by the difference weight Wa, and the sum total of the pixel values that are multiplied by the difference weight Wa is obtained.

Meanwhile, when a luminance information map is to be created, the up-conversion of the difference images is performed so that the difference images will have the same size.

In the manner described above, the luminance information extraction unit 121 obtains a luminance image from the input image, and creates a luminance information map from the luminance image. In the luminance information extraction unit 121, the difference between the luminance of respective areas of the input image and the average luminance of the area in the surroundings of the area of the input image is extracted as feature quantity, and a luminance information map indicating the feature quantity is created. According to the luminance information map obtained in this manner, it is possible to easily detect an area having a large luminance difference in the input image, that is, an area that is easily recognizable by an observer who casts a quick glance at the input image.

[Description of Color Information Extraction Process]

Figure 22:
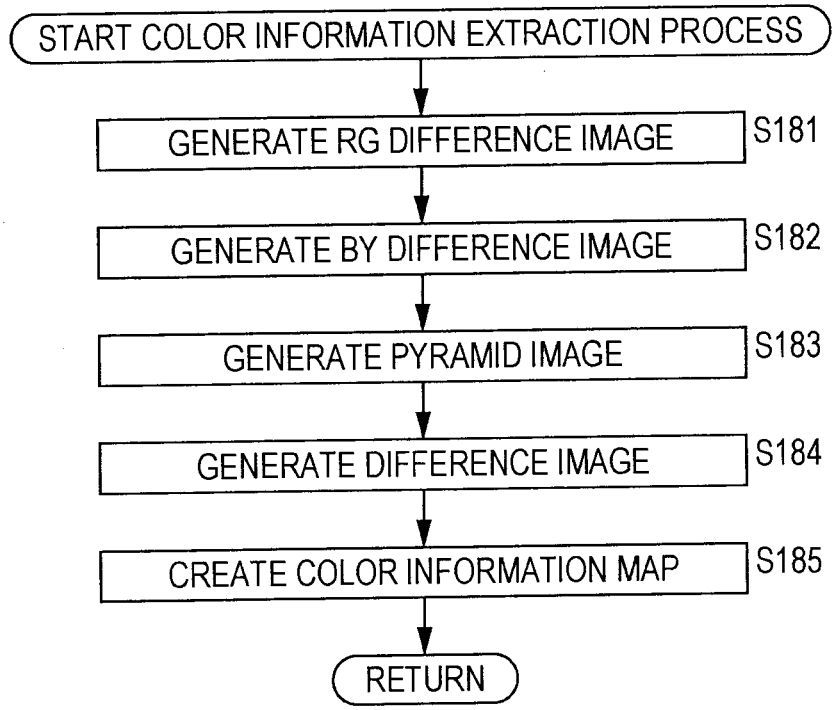
FIG. 22 is a flowchart illustrating a color information extraction process.

Next, a description will be given, with reference to the flowchart of FIG. 22, of a color information extraction process corresponding to the process of step S112 of FIG. 20.

In step S181, the RG difference image generation unit 181 generates an RG difference image by using the input image supplied from the obtaining unit 22, and supplies the RG difference image to the pyramid image generation unit 183.

In step S182, the BY difference image generation unit 182 generates a BY difference image by using the input image supplied from the obtaining unit 22, and supplies the BY difference image to the pyramid image generation unit 184.

In step S183, the pyramid image generation unit 184 and the pyramid image generation unit 183 generate pyramid images by using the RG difference image from the RG difference image generation unit 181 and the BY difference image from the BY difference image generation unit 182, respectively.

For example, the pyramid image generation unit 183 generates a plurality of RG difference images having different resolutions so as to generate pyramid images of each hierarchy of the level L1 to the level L8, and supplies the plurality of RG difference images to the difference calculation unit 185. Similarly, the pyramid image generation unit 184 generates a plurality of BY difference images having different resolutions so as to generate pyramid images of each hierarchy of the level L1 to the level L8, and supplies the plurality of BY difference images to the difference calculation unit 186.

In step S184, the difference calculation unit 186 and the difference calculation unit 185 generate and normalize the difference images on the basis of the pyramid images supplied from the pyramid image generation unit 183 and the pyramid image generation unit 184, and supplies the difference images to the color information map creation unit 187 and the color information map creation unit 188, respectively. In the normalization of the difference images, for example, the pixel value of the pixel is set to be a value between 0 and 255.

For example, the difference calculation unit 185 obtains differences between pyramid images of the combinations of level L6 and level L3, level L7 and level L3, level L7 and level L4, level L8 and level L4, and level L8 and level L5 among the pyramid images of the difference of RG of each hierarchy. As a result, a total of five images of the difference of RG are obtained.

Similarly, the difference calculation unit 186 obtains differences between pyramid images of the combinations of level L6 and level L3, level L7 and level L3, level L7 and level L4, level L8 and level L4, and level L8 and level L5 among the pyramid images of the difference of BY of each hierarchy. As a result, a total of five images of the difference of BY are obtained.

The process for generating these difference images is equivalent to that in which a filtering process using a bandpass filter is performed on an RG difference image or a BY difference image so as to extract predetermined frequency components from the RG difference image or the BY difference image. The pixel value of the pixel of the difference image obtained in this manner indicates a difference between specific color components of pyramid images of each level, that is, a difference between components of a specific color in the pixel of the input image and components of an average specific color in the surrounding area of the pixel.

In general, an area having a conspicuous color in comparison with the surrounding area in the image, that is, an area having a large difference with the surrounding area of specific color components, is an area that attracts the attention of the person who views the image. Hence, the area has a high probability of being the area of a subject. Therefore, it can be said that the pixel having a larger pixel value in each difference image indicates that the area is more probable to be the area of the subject.

In step S185, the color information map creation unit 188 and the color information map creation unit 187 create color information maps by using the difference images from the difference calculation unit 185 and the difference calculation unit 186, respectively, and supplies them to the subject map creation unit 125.

For example, the color information map creation unit 187 performs weighted addition of the difference images of RG supplied from the difference calculation unit 185 by using the difference weight Wa for each difference image obtained in advance, thereby forming one color information map of the difference of RG.

Similarly, the color information map creation unit 188 performs weighted addition of the difference images of BY supplied from the difference calculation unit 186 by using the difference weight Wa obtained in advance, thereby forming one color information map of the difference of BY. Meanwhile, when the color information map is to be created, the up-conversion of the difference images is performed so that the difference images will have the same size.

When the color information map creation unit 187 and the color information map creation unit 188 supply the color information map of the difference of RG and the color information map of the difference of BY, respectively, which are obtained in the manner described above, to the subject map creation unit 125, the color information extraction process is completed. The process then proceeds to step S113 of FIG. 20.

In the manner described above, the color information extraction unit 122 obtains the image of the difference of the components of a specific color from the input image, and creates a color information map from the image. That is, in the color information extraction unit 122, the difference between specific color components of respective areas of the input image and average specific color components of an area in the surroundings of the area of the input image is extracted as feature quantity, and a color information map indicating the feature quantity is created. According to the color information map obtained in the manner described above, it is possible to easily detect an area having a larger difference of the specific color components, that is, an area that is easily recognizable by an observer who casts a quick glance at the input image.

Meanwhile, in the color information extraction unit 122, it has been described that as information on colors extracted from the input image, a difference between R (red) components and G (green) components and a difference between B (blue) components and Y (yellow) components are extracted. Alternatively, color-difference components Cr and color-difference components Cb may be extracted. Here, the color-difference components Cr are a difference between R components and luminance components, and the color-difference components Cb are a difference between B components and luminance components.

[Description of Edge Information Extraction Process]

Figure 20:
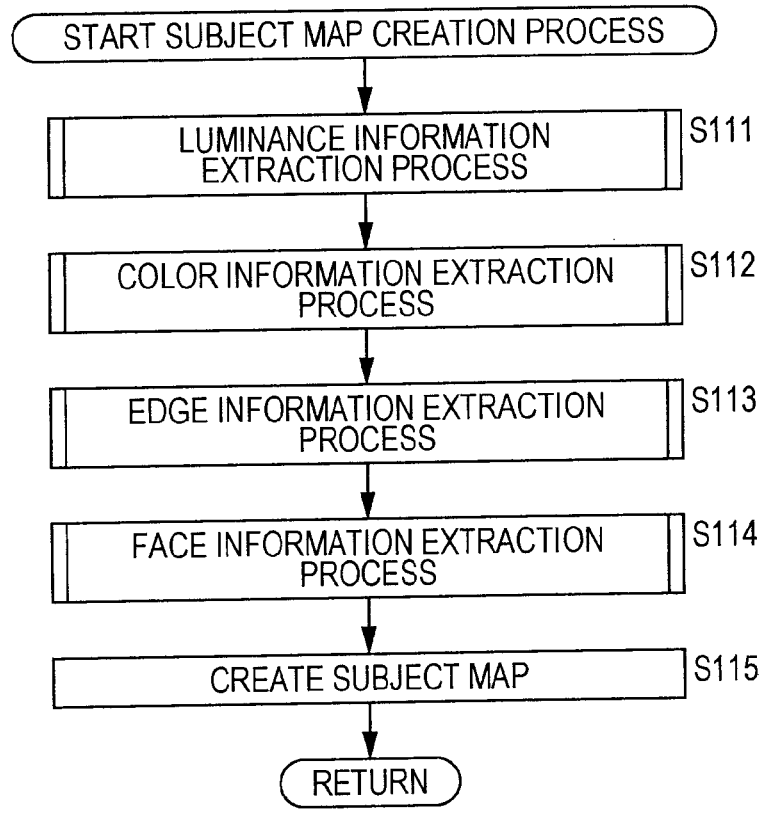
FIG. 20 is a flowchart illustrating a subject map creation process.
Figure 21:
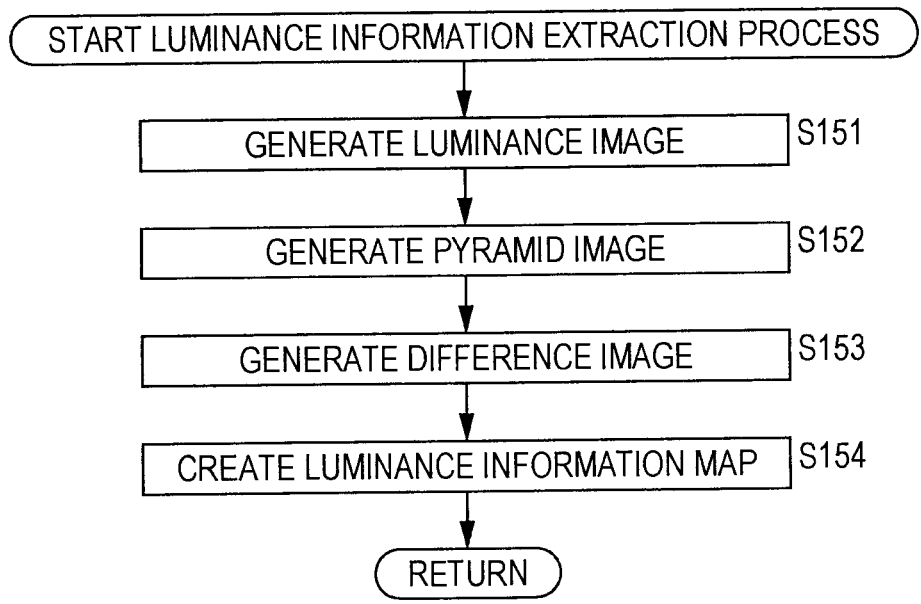
FIG. 21 is a flowchart illustrating a luminance information extraction process.
Figure 23:
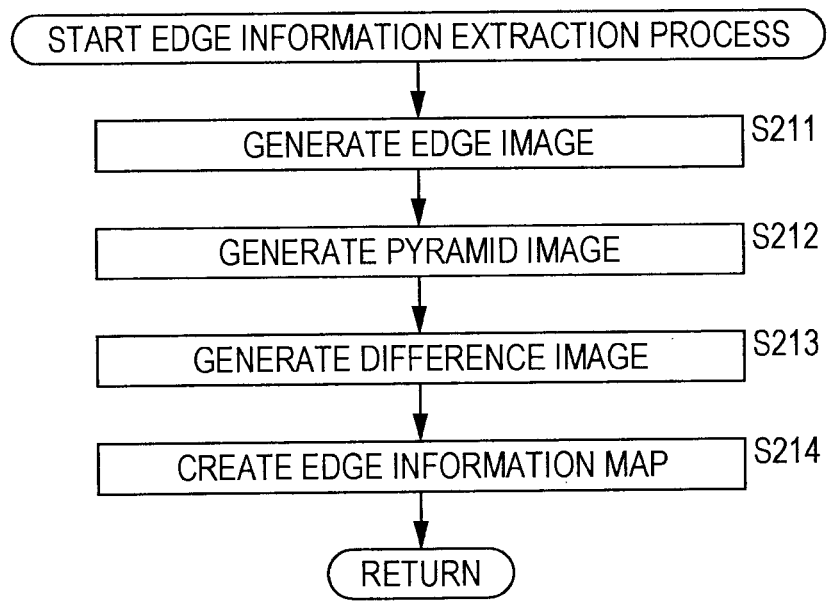
FIG. 23 is a flowchart illustrating an edge information extraction process.

FIG. 23 is a flowchart illustrating an edge information extraction process corresponding to the process of step S113 of FIG. 20. This edge information extraction process will be described below.

In step S211, the edge image generation unit 211 through to the edge image generation unit 214 perform a filtering process using a Gabor filter on the input image supplied from the obtaining unit 22, and generate edge images in which edge strengths in the direction of 0 degrees, 45 degrees, 90 degrees, and 135 degrees are pixel values of the pixel. Then, the edge image generation unit 211 through to the edge image generation unit 214 supply the generated edge images to the pyramid image generation unit 215 through to the pyramid image generation unit 218, respectively.

In step S212, the pyramid image generation unit 215 through to the pyramid image generation unit 218 generate pyramid images by using the edge images from the edge image generation unit 211 through to the edge image generation unit 214, respectively, and supplies the pyramid images to the difference calculation unit 219 through to the difference calculation unit 222, respectively.

For example, the pyramid image generation unit 215 generates a plurality of edge images in the direction of 0 degrees having different resolutions so as to generate a pyramid image of each hierarchy of the level L1 to level L8, and supplies the pyramid image to the difference calculation unit 219. Similarly, the pyramid image generation unit 216 through to the pyramid image generation unit 218 generate pyramid images of each hierarchy of the level L1 to level L8, and supplies the pyramid images to the difference calculation unit 220 through to the difference calculation unit 222, respectively.

In step S213, the difference calculation unit 219 through to the difference calculation unit 222 generate and normalize difference images by using the pyramid images from the pyramid image generation unit 215 through to the pyramid image generation unit 218, respectively, and supply the difference images to the edge information map creation unit 223 through to the edge information map creation unit 226, respectively. In the normalization of the difference images, for example, the pixel value of the pixel is set to be a value between 0 to 255.

For example, the difference calculation unit 219 obtains differences between pyramid images of the combinations of level L6 and level L3, level L7 and level L3, level L7 and level L4, level L8 and level L4, and level L8 and level L5 among the pyramid images of the edge in the direction of 0 degrees of each hierarchy, which are supplied from the pyramid image generation unit 215. As a result, a total of five difference images of the edge are obtained.

Similarly, the difference calculation unit 220 through to the difference calculation unit 222 obtain differences between pyramid images of the combinations of level L6 and level L3, level L7 and level L3, level L7 and level L4, level L8 and level L4, and level L8 and level L5 among the pyramid images of each hierarchy. As a result, a total of five difference images of the edge are obtained with respect to the edge in each direction.

The process for generating these difference images is equivalent to that in which a filtering process using a bandpass filter is performed on the edge image so as to extract predetermined frequency components from the edge image. The pixel value of the pixel of the difference image obtained in this manner indicates a difference between edge strengths of pyramid images of each level, that is, a difference between the edge strength at a predetermined position of the input image and an average edge strength in the surrounding area of the position.

In general, an area having a stronger edge strength in comparison with the surrounding area in the image is an area that attracts the attention of the person who views the image. Hence, the area has a high probability of being the area of a subject. Therefore, it can be said that the pixel having a larger pixel value in each difference image indicates that the area is more probable to be the area of the subject.

In step S214, the edge information map creation unit 223 through to the edge information map creation unit 226 create edge information maps in each direction by using the difference images from the difference calculation unit 219 through to the difference calculation unit 222, respectively, and supplies them to the subject map creation unit 125.

For example, the edge information map creation unit 223 performs weighted addition of the difference images supplied from the difference calculation unit 219 by using the difference weight Wa obtained in advance so as to form an edge information map in the direction of 0 degrees.

Similarly, the edge information map creation unit 224 through to the edge information map creation unit 226 perform weighted addition of the difference images from the difference calculation unit 220 through to the difference calculation unit 222 by using the difference weight Wa, respectively, so as to create edge information maps in the direction of each of 45 degrees, 90 degrees, and 135 degrees, respectively. Meanwhile, when an edge information map is to be created, the up-conversion of the difference image is performed so that the difference images will have the same size.

When the edge information map creation unit 223 through to the edge information map creation unit 226 supply a total of four edge information maps obtained in the manner described above to the subject map creation unit 125, the edge information extraction process is completed. The process then proceeds to step S114 of FIG. 20.

In the manner described above, the edge information extraction unit 123 obtains the difference image of the edge in a specific direction from the input image, and creates an edge information map from the difference image. That is, in the edge information extraction unit 123, the difference between the edge strength in a specific direction in respective areas of the input image and the average edge strength in a specific direction of the area in the surroundings of the area of the input image is extracted as a feature quantity, and an edge information map indicating the feature quantity is created. According to the edge information map for each direction obtained in the manner described above, it is possible to easily detect an area having a large edge strength in a specific direction in comparison with the surrounding area in the input image, that is, an area that is easily recognizable by an observer who casts a quick glance at the input image.

Meanwhile, in the edge information extraction process, it has been described that a Gabor filter is used to extract an edge. Alternatively, an edge extraction filter, such as a Sobel filter or a Roberts filter, may be used.

[Description of Face Information Extraction Process]

Figure 24:
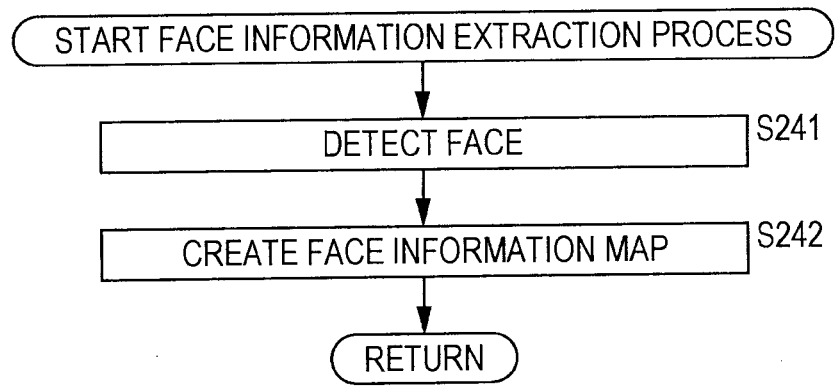
FIG. 24 is a flowchart illustrating a face information extraction process.

Next, a description will be given, with reference to the flowchart of FIG. 24, of a face information extraction process corresponding to the process of step S114 of FIG. 20.

In step S241, the face detection unit 251 detects the area of the face of a person from the input image supplied from the obtaining unit 22, and supplies the detection result to the face information map creation unit 252. For example, the face detection unit 251 performs a filtering process using a Gabor filter on an input image, and detects the area of the face in the input image by extracting feature areas, such as the eyes, the mouth, the nose, and the like of a person from the input image.

In step S242, the face information map creation unit 252 creates a face information map by using the detection result from the face detection unit 251, and supplies the face information map to the subject map creation unit 125.

It is assumed that, for example, as the detection result of the face from the input image, a plurality of rectangular areas (hereinafter referred to as candidate areas) in the input image, in which a face is estimated to be contained, are detected. Here, it is also assumed that a plurality of candidate areas are detected in the vicinity of a predetermined position in the input image, and portions of those candidate areas may overlap with one another. That is, for example, in a case where a plurality of areas containing a face with respect to the area of one face in the input image are obtained as candidate areas, portions of those candidate areas overlap with one another.

The face information map creation unit 252 generates a detection image having the same size as that of the input image for each candidate area with respect to the candidate area obtained by detecting the face. This detection image is formed in such a manner that the pixel value of the pixel in the same area as that of the candidate area to be processed in the detected image is a value greater than the pixel value of the pixel in an area different from the candidate area.

Furthermore, the closer the pixel value of the pixel at the same position as that of the candidate area that is estimated to have a probability of containing the face of a person, the greater the pixel value of the pixel in the detected image. The face information map creation unit 252 adds up detection images obtained in the manner described above so as to generate and normalize one image, thereby forming a face information map. Therefore, in the face information map, the pixel value of the pixel in the same area as the area that overlaps portions of the plurality of candidate areas in the input image is increased, and the probability that the face is contained is higher. Meanwhile, in the normalization, the pixel value of the pixel is set to be a value between 0 and 255.

When the face information map is created, the face information extraction process is completed. The process then proceeds to step S15 of FIG. 20.

In the manner described above, the face information extraction unit 124 detects the face from the input image, and creates a face information map from the detection result. According to the face information map obtained in the manner described above, it is possible to easily detect the area of the face of a person as a subject.

In the subject extraction unit 91 of FIG. 4, each information map is created as described above, and a subject map is created from those information maps.

[Description of Edge Score Calculation Process]

Figure 25:
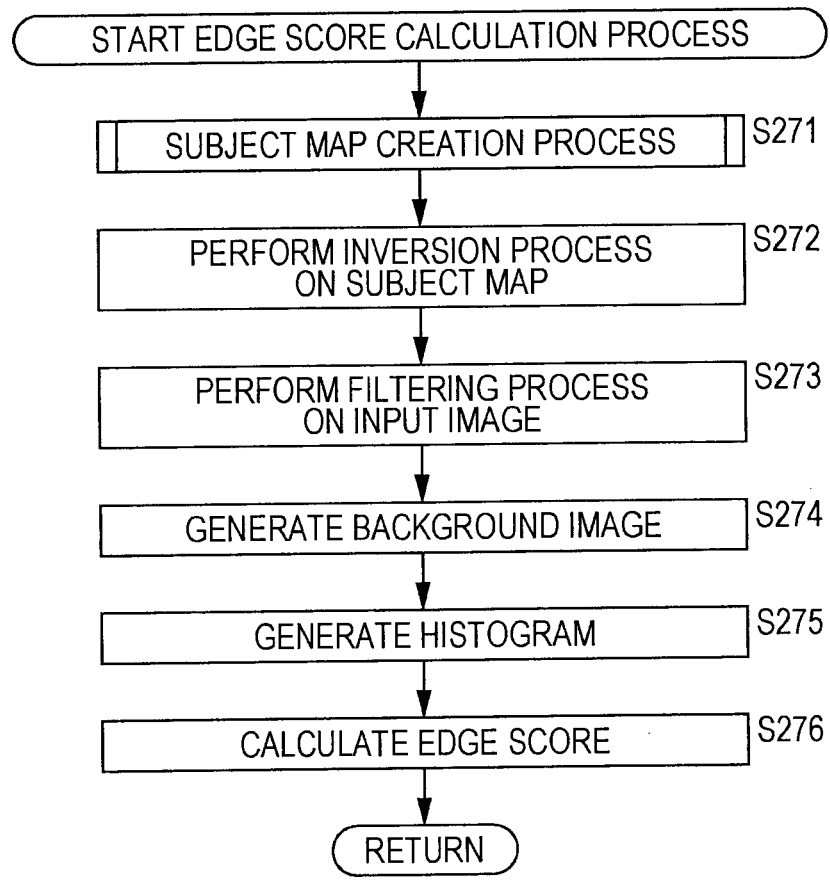
FIG. 25 is a flowchart illustrating an edge score calculation process.
Figure 26:
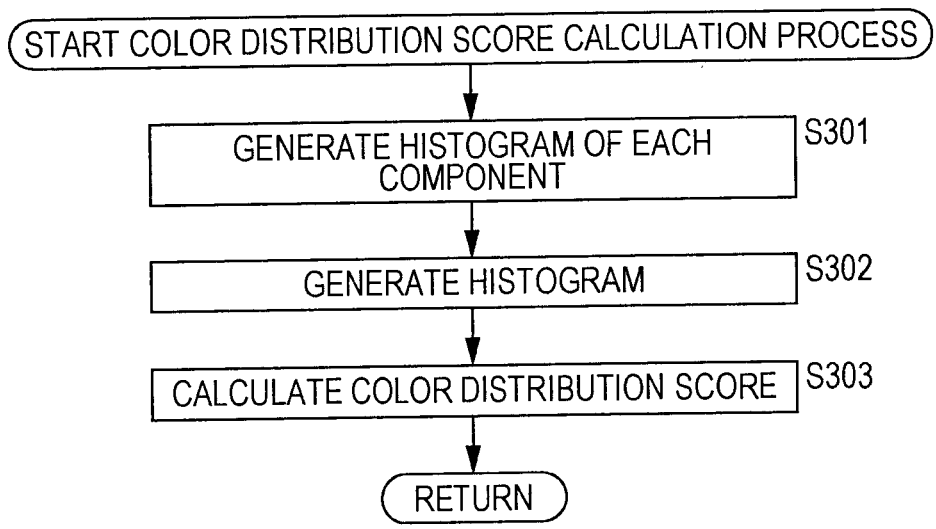
FIG. 26 is a flowchart illustrating a color distribution score calculation process.
Figure 27:
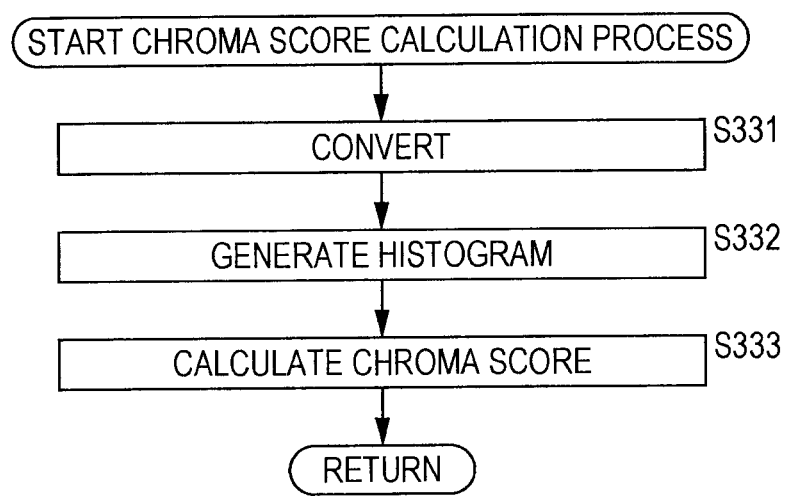
FIG. 27 is a flowchart illustrating a chroma score calculation process.

Furthermore, a description will be given below, with reference to FIGS. 25 to 27, of an edge score calculation process, a color distribution score calculation process, and a chroma score calculation process corresponding to the processes of steps S14 to S16 of FIG. 12.

First, a description will be given, with reference to the flowchart of FIG. 25, of an edge score calculation process corresponding to the process of step S14 of FIG. 12. This process is performed by the edge score calculation unit 25 of FIG. 9.

In step S271, the subject extraction unit 281 performs a subject map creation process so as to create a subject map from the input image supplied from the obtaining unit 22, and supplies the subject map to the inversion unit 282. Meanwhile, this subject map creation process is a process identical to the subject map creation process described with reference to FIG. 20, and thus, the description thereof is omitted.

In step S272, the inversion unit 282 performs an inversion process on the subject map supplied from the subject extraction unit 281, and supplies the subject map to the multiplication unit 285. That is, the pixel value of each pixel of the subject map is inverted from 1 to 0, or from 0 to 1. As a result, use of a subject map after inversion enables a background portion in the input image to be extracted.

In step S273, the filter processing unit 283 performs a filtering process using a Laplacian filter on the input image supplied from the obtaining unit 22 so as to generate a Laplacian image, and supplies the Laplacian image to the normalization unit 284. Furthermore, the normalization unit 284 normalizes the Laplacian image from the filter processing unit 283, and supplies the Laplacian image to the multiplication unit 285.

In step S274, the multiplication unit 285 generates a background image by multiplying the Laplacian image from the normalization unit 284 by the inverted subject map from the inversion unit 282, and supplies the background image to the histogram generation unit 286. That is, the product of the pixel values of the pixels of the Laplacian image and the subject map at the same position is obtained, and the product is set as the pixel value of the pixel of the background image. The background image obtained in this manner is an image indicating the edge strength of a portion that is not the area of the subject in the input image, that is, the background portion.

In step S275, by using the background image supplied from the multiplication unit 285, the histogram generation unit 286 generates a histogram indicating the complexity of the edge in the background portion of the input image.

That is, first, the histogram generation unit 286 performs a threshold process on the background image. Specifically, the pixel value of the pixel whose pixel value greater than or equal to a threshold value among the pixels of the background image is kept to be the value as is, and the pixel value of the pixel whose pixel value is less than the threshold value is set to 0.

Next, the histogram generation unit 286 generates a histogram of edges in which the range of the pixel values of the pixels of the background image, that is, the range of the value of the edge strength, is a bin. Then, the histogram generation unit 286 supplies the generated histogram of the edge to the score calculation unit 287.

In step S276, the score calculation unit 287 calculates an edge score by using the histogram supplied from the histogram generation unit 286, and supplies the edge score to the overall score calculation unit 28.

For example, the range of the value that the pixel value of the background image after the threshold process can take is assumed to be from 0 to 1. At this time, the score calculation unit 287 extracts, as a maximum frequent value Ma, the frequent value of the bin having the highest frequent value among one or plural bins, which are contained in the range of the pixel value (edge strength) "0" to "0.1" in the histogram. That is, among the bins whose representative value is between 0 and 0.1, the bin having the highest frequent value is selected, and the frequent value of the bin is set as the maximum frequent value Ma.

Furthermore, the score calculation unit 287 extracts, as a minimum frequent value Mb, the frequent value of the bin whose frequent value is lowest among one or plural bins contained in the range of the pixel value (edge strength) "0.8" to "0.9" in the histogram. That is, the bin having the lowest frequent value among the bins whose representative value is between 0.8 and 0.9 is selected, and the frequent value of the bin is set as the minimum frequent value Mb.

Then, the score calculation unit 287 subtracts the minimum frequent value Mb from the maximum frequent value Ma, and sets the thus obtained value as an edge score. The edge score obtained in this manner indicates the difference between the number of pixels having a small edge strength and the number of pixels having a large edge strength in the background portion of the input image, that is, the complexity of the edge in the background portion.

In general, in an amateur image, the edge of the background portion is complex, and often, the maximum frequent value Ma is increased and the minimum frequent value Mb is decreased. That is, the edge score of an image close to an amateur image has a high probability of becoming a large value. On the other hand, in a professional image, the edge of the background portion is simple, that is, the number of pixels whose edge strength is large is small, and often, the maximum frequent value Ma and the minimum frequent value Mb are small. That is, the edge score of the image close to a professional image has a high probability of becoming a small value. Therefore, the smaller the value of the edge score, the higher the evaluation of the image-capture state of the input image indicates.

When the calculated edge score is supplied from the score calculation unit 287 to the overall score calculation unit 28, the edge score calculation process is completed. Thereafter, the process proceeds to step S15 of FIG. 12.

In the manner described above, the edge score calculation unit 25 extracts the background portion from the input image, and calculates the edge score indicating the complexity of the edge strength of the background portion on the basis of the edge strength of the background portion. As described above, by calculating the edge score by targeting only the background portion, it is possible to more appropriately evaluate the image-capture state of the input image.

That is, there is a tendency that the edge of the background portion of the amateur image is complex and the edge of the background portion of the professional image is simple. Accordingly, by using such a tendency, an edge score indicating the complexity of the edge of only the background portion is obtained. Consequently, it is possible to more easily and appropriately evaluate the image-capture state of the input image regardless of whether or not the edge in the subject portion is complex.

[Description of Color Distribution Score Calculation Process]

Next, a description will be given, with reference to the flowchart of FIG. 26, of a color distribution score calculation process corresponding to the process of step S15 of FIG. 12.

In step S301, the R component histogram generation unit 311 through to the B component histogram generation unit 313 generate histograms of each component of R (red), G (green), and B (blue) from the input image supplied from the obtaining unit 22, and supply the histograms to the normalization unit 314 through to the normalization unit 316, respectively. For example, as the histogram of the R component, a histogram in which the range of the value of the R component of the input image is a bin is generated.

Furthermore, the normalization unit 314 through to the normalization unit 316 normalize the histograms for each component from the R component histogram generation unit 311 through to the B component histogram generation unit 313, respectively, and supplies the histograms to the histogram generation unit 317.

In step S302, by using the histograms for each color component supplied from the normalization unit 314 through to the normalization unit 316, the histogram generation unit 317 generates a histogram of a color composed of each component of R, G, and B, and supplies the histogram to the score calculation unit 318.

For example, in a case where the histogram of each component of R, G, and B is formed from 16 bins, one histogram formed from $16^3$ bins with respect to the color composed of R, G, and B components is generated. This histogram indicates the distribution of the color in the entire input image.

In step S303, on the basis of the histogram supplied from the histogram generation unit 317, the score calculation unit 318 calculates a color distribution score by using the K-NN method or the like, and supplies the color distribution score to the overall score calculation unit 28.

For example, the score calculation unit 318 holds a plurality of histograms of color, which are generated by the same processes as the processes of steps S301 and S302, with regard to the professional image and the amateur image that are prepared in advance. The score calculation unit 318 calculates the distance between the respective histograms of the plurality of professional images and amateur images that are held in advance and the histogram from the histogram generation unit 317.

Here, the distance between the histograms is the total value of the differences in the frequent values of each bin between the histogram of the color of the input image and one histogram that is held in advance.

In addition, the score calculation unit 318 selects K distances in the ascending order of the value of the distance from among the plurality of obtained distances, and subtracts the number of distances of the histograms of the input image and the amateur image from the number of distances of the histograms of the input image and the professional image among the selected distances. Then, the score calculation unit 318 sets the value obtained as the result of the subtraction as a color distribution score.

Regarding the color distribution score obtained in this manner, similarly to the above-mentioned luminance score, the greater the number of professional images whose distribution of the color resembles that of the input image, the greater the value thereof. That is, the color distribution score indicates the degree in which the color distribution of the input image resembles that of the professional image. The greater the value of the color distribution score of the input image, the higher the evaluation of the image-capture state of the image is.

When the color distribution score is calculated, the score calculation unit 318 supplies the calculated color distribution score to the overall score calculation unit 28, and the color distribution score calculation process is completed. Thereafter, the process then proceeds to step S16 of FIG. 12.

As described above, the color distribution score calculation unit 26 compares the color distribution in the input image with the color distribution of the professional image and the amateur image that are prepared in advance so as to calculate a color distribution score. By comparing the color distribution of the entire input image in this manner so as to calculate a color distribution score, it is possible to more appropriately evaluate the image-capture state of the input image.

That is, in a case where the image-capture state of an image is to be evaluated by using the color distribution as an index, it is necessary to view the entire image. Consequently, by targeting the entire input image and by comparing the color distribution of the input image with that of another image, it is possible to more appropriately evaluate the image-capture state of the input image.

[Description of Chroma Score Calculation Process]

Next, a description will be given, with reference to the flowchart of FIG. 27, of a chroma score calculation process corresponding to the process of step S16 of FIG. 12.

In step S331, the conversion unit 341 converts the input image supplied from the obtaining unit 22 into an input image composed of the value of each component of H (hue), S (chroma), and V (brightness), and supplies the input image to the histogram generation unit 342.

In step S332, the histogram generation unit 342 generates a histogram of the component of the chroma by using the input image supplied from the conversion unit 341, and supplies the histogram to the score calculation unit 343. For example, the histogram generation unit 342 extracts pixels whose H (hue) component is a predetermined threshold value th1 or more and whose V (brightness) component is greater than or equal to a predetermined threshold value th2 from among the pixels of the input image, and generates a histogram in which the range of the value of the S (chroma) component of the pixels is a bin by using the extracted pixels.

In step S333, the score calculation unit 343 calculates a chroma score by using the histogram supplied from the histogram generation unit 342, and supplies it to the overall score calculation unit 28.

For example, the score calculation unit 343 performs approximation using GMM (Gaussian Mixture Model) on the histogram of chroma, and obtains the degree of importance, the average value, and the variance of each distribution with respect to one or plural distributions. Meanwhile, the term "distribution" referred to herein refers to a portion having one peak in the entire distribution curve obtained by the approximation.

The score calculation unit 343 sets each of the variance and the average value of the distribution having the highest degree of importance as a chroma score. Therefore, in the process of step S17 of FIG. 12, each of the variance and the average value of the chroma as the chroma score is converted into a score point by using a conversion table.

The chroma score obtained in this manner indicates the average value and the variance of the chroma components of the entire input image. The values of the average value and the variance make it possible to identify which one of the professional image and the amateur image the input image is close to. Therefore, the chroma score makes it possible to evaluate the image-capture state of the input image.

When the chroma score is calculated, the score calculation unit 343 supplies the calculated chroma score to the overall score calculation unit 28, and the chroma score calculation processes is completed. Thereafter, the process then proceeds to step S17 of FIG. 12.

As described above, the chroma score calculation unit 27 calculates the average value and the variance of the chroma in the input image as chroma scores. By obtaining the average value and the variance of the chroma so as to be set as chroma scores by targeting the entire input image in the manner described above, it is possible to more appropriately evaluate the image-capture state of the input image.

That is, in a case where the image-capture state of an image is to be evaluated by using chroma as an index, it is necessary to view the entire image. Consequently, by calculating the average value and the variance of chroma by targeting the entire input image, it is possible to more appropriately evaluate the image-capture state of the input image.

The above-described series of processes can be performed by hardware and software. In a case where the series of processes is to be performed by software, a program forming the software is installed from a program recording medium into a computer built in dedicated hardware or, for example, a general-purpose personal computer capable of performing various functions by installing various programs thereon.

Figure 28:
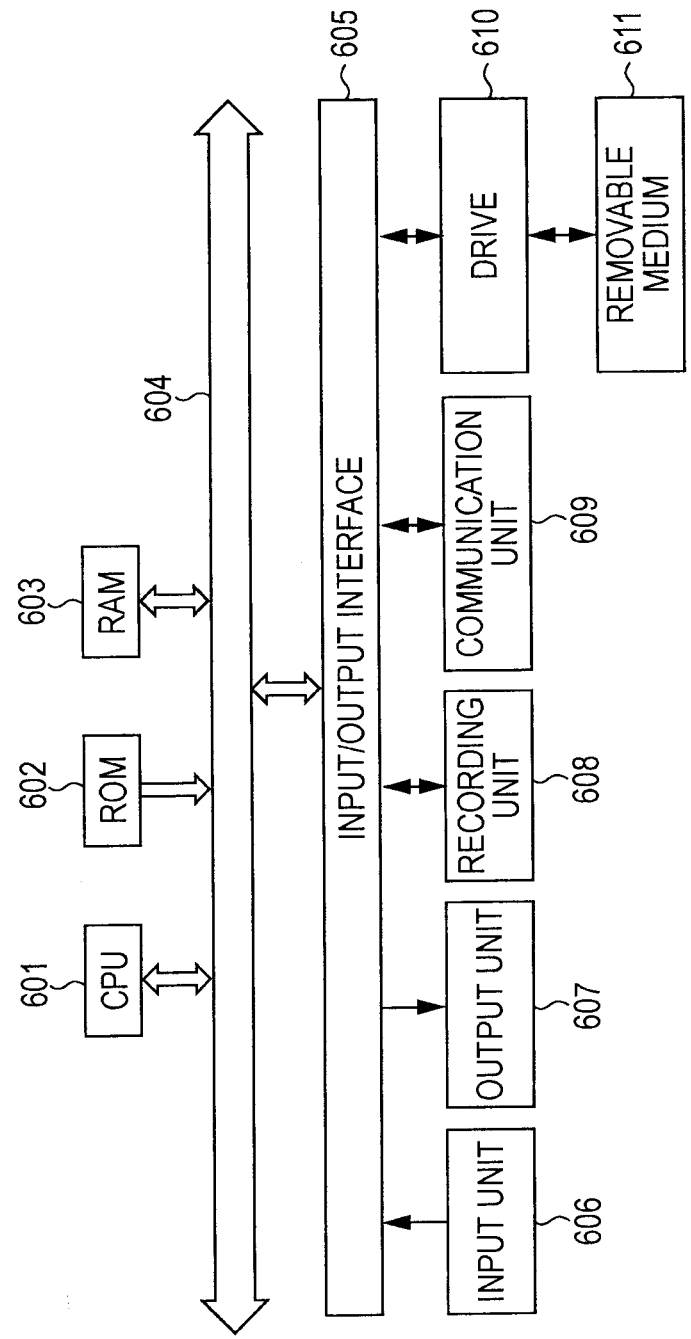
FIG. 28 illustrates an example of the configuration of a computer.

FIG. 28 is a block diagram illustrating an example of the configuration of a computer that performs the above-mentioned series of processes in accordance with programs.

In the computer, a CPU (Central Processing Unit) 601, a ROM (Read Only Memory) 602, and a RAM (Random Access Memory) 603 are interconnected with one another through a bus 604.

An input/output interface 605 is further connected to the bus 604. An input unit 606 including a keyboard, a mouse, a microphone, and the like, an output unit 607 including a display, a speaker, and the like, a recording unit 608 including a hard disk, a non-volatile memory, and the like, a communication unit 609 including a network interface, and the like, and a drive 610 for driving a removable medium 611, such as a magnetic disc, an optical disc, a magneto-optical disc, or a semiconductor memory, are connected to the input/output interface 605.

In the computer configured as described above, the CPU 601 loads, for example, a program recorded in the recording unit 608 into the RAM 603 through the input/output interface 605 and the bus 604 and executes the program, thereby performing the above-mentioned series of processes.

The program executed by the computer (the CPU 601) is provided by, for example, recording it on the removable medium 611, which is a packaged medium such as a magnetic disk (including a flexible disk), an optical disc (including a CD-ROM (Compact Disc-Read Only Memory), a DVD (Digital Versatile Disc) or the like), a magneto-optical disc, a semiconductor memory, or the like. Alternatively, the program is provided via a wired or wireless transmission medium, such as a local area network, the Internet, or digital satellite broadcasting.

Then, the program can be installed into the recording unit 608 via the input/output interface 605 by mounting the removable medium 611 onto the drive 610. Alternatively, the program can be received at the communication unit 609 via a wired or wireless transmission medium and installed into the recording unit 608. Alternatively, the program can be installed in advance in the ROM 602 or the recording unit 608.

Meanwhile, the program executed by the computer may be a program with which the processes are performed in a time-sequential manner in accordance with the order described in the specification, or may be a program with which the processes are executed in parallel or at necessary times, such as when called.

Meanwhile, the embodiments of the present invention are not limited to the foregoing embodiments, and various modifications can be made without departing from the scope and spirit of the present invention.

REFERENCE SIGNS LIST 23 blur degree score calculation unit, 24 luminance score calculation unit, 25 edge score calculation unit, 26 color distribution score calculation unit, 27 chroma score calculation unit, 28 overall score calculation unit, 29 display control unit, 91 subject extraction unit

The invention claimed is:
1. An image processing apparatus comprising:
first evaluation value calculation means for extracting a feature quantity of a first feature from the entirety of an input image, and for calculating a first partial evaluation value indicating an evaluation for the input image based on the first feature on the basis of the feature quantity of the first feature;

second evaluation value calculation means for extracting a feature quantity of a second feature from a predetermined area of the input image, and for calculating a second partial evaluation value indicating an evaluation for the input image based on the second feature on the basis of the feature quantity of the second feature; and overall evaluation value calculation means for calculating an overall evaluation value indicating an evaluation of an image-capture state of the input image on the basis of the first partial evaluation value and the second partial evaluation value, wherein the second evaluation value calculation means comprises:

calculation means for extracting the feature quantity of the second feature from one of a subject area in which the subject is contained in the input image and a background area in which the subject is not contained in the input image, and for calculating the second partial evaluation value, and wherein the calculation means extracts, as the feature quantity of the second feature, an edge strength in respective areas of the background area in the input image, and calculates the second partial evaluation value based on a complexity of the edge in the background area.

2. The image processing apparatus according to claim 1, wherein the second partial evaluation value calculation means comprises subject area identification means for extracting, from respective areas of the input image, a feature quantity of a third feature possessed by an area of a subject in the input image so as to identify the area of the subject in the input image.

3. The image processing apparatus according to claim 1, wherein the calculation means extracts, as the feature quantity of the second feature, a luminance value in respective areas of the subject area in the input image, and calculates the second partial evaluation value based on a distribution of the luminance values in the subject area.

4. The image processing apparatus according to claim 1, wherein the first evaluation value calculation means calculates the first partial evaluation value based on at least one of a degree of blur, a distribution of color, an average of chroma, and a variance of chroma in the entirety of the input image.

5. The image processing apparatus according to claim 1, wherein the overall evaluation value calculation means adds a value that is pre-specified with respect to the value of the first partial evaluation value and a value that is pre-specified with respect to the value of the second partial evaluation value so as to calculate the overall evaluation value.

6. The image processing apparatus according to claim 5, wherein the value that is pre-specified with respect to the value of the first partial evaluation value is determined on the basis of the first partial evaluation value of a plurality of images having different evaluations of image-capture states, the evaluations being obtained in advance, and wherein the value that is pre-specified with respect to the value of the second partial evaluation value is determined on the basis of the second partial evaluation value of a plurality of images having different evaluations of the image-capture states, the evaluations being obtained in advance.

7. An image processing method carried out by a microprocessor of an image processing apparatus, the image processing apparatus comprising:

first evaluation value calculation means for extracting a feature quantity of a first feature from the entirety of an input image, and for calculating a first partial evaluation value indicating an evaluation for the input image based on the first feature on the basis of the feature quantity of the first feature, second evaluation value calculation means for extracting a feature quantity of a second feature from a predetermined area of the input image, and for calculating a second partial evaluation value indicating an evaluation for the input image based on the second feature on the basis of the feature quantity of the second feature, and overall evaluation value calculation means for calculating an overall evaluation value indicating an evaluation of an image-capture state of the input image on the basis of the first partial evaluation value and the second partial evaluation value, the image processing method comprising the steps of:

calculating, by using the first evaluation value calculation means, the first partial evaluation value on the basis of the input image;

calculating, by using the second evaluation value calculation means, the second partial evaluation value on the basis of the input image; and calculating, by using the overall evaluation value calculation means, the overall evaluation value on the basis of the first partial evaluation value and the second partial evaluation value, wherein the second evaluation value calculation means comprises:

calculation means for extracting the feature quantity of the second feature from one of a subject area in which the subject is contained in the input image and a background area in which the subject is not contained in the input image, and for calculating the second partial evaluation value, and wherein the calculation means extracts, as the feature quantity of the second feature, an edge strength in respective areas of the background area in the input image, and calculates the second partial evaluation value based on a complexity of the edge in the background area.

8. A non-transitory, computer-readable medium comprising instructions for causing a computer to perform processing comprising the steps of:

extracting a feature quantity of a first feature from the entirety of an input image, and calculating a first partial evaluation value indicating an evaluation for the input image based on the first feature on the basis of the feature quantity of the first feature;

extracting a feature quantity of a second feature from a predetermined area of the input image and calculating a second partial evaluation value indicating an evaluation for the input image based on the second feature on the basis of the feature quantity of the second feature;

calculating an overall evaluation value indicating an evaluation of an image-capture state of the input image on the basis of the first partial evaluation value and the second partial evaluation value;

extracting the feature quantity of the second feature from one of a subject area in which the subject is contained in the input image and a background area in which the subject is not contained in the input image, and for calculating the second partial evaluation value; and extracting, as the feature quantity of the second feature, an edge strength in respective areas of the background area in the input image, and calculates the second partial evaluation value based on a complexity of the edge in the background area.

* * * * *